(12) United States Patent
Yoshimoto

(10) Patent No.: US 11,809,754 B2
(45) Date of Patent: Nov. 7, 2023

(54) PRINTING CONTROL SYSTEM

(71) Applicant: SHARP KABUSHIKI KAISHA, Sakai (JP)

(72) Inventor: Kazuhiro Yoshimoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/676,614

(22) Filed: Feb. 21, 2022

(65) Prior Publication Data

US 2022/0300216 A1  Sep. 22, 2022

(30) Foreign Application Priority Data

Mar. 22, 2021  (JP) .................................. 2021-047334

(51) Int. Cl.
*G06F 3/12* (2006.01)

(52) U.S. Cl.
CPC ............ *G06F 3/1203* (2013.01); *G06F 3/121* (2013.01); *G06F 3/1212* (2013.01); *G06F 3/1236* (2013.01); *G06F 3/1267* (2013.01); *G06F 3/1268* (2013.01); *G06F 3/1285* (2013.01)

(58) Field of Classification Search
CPC ...... G06F 3/1203; G06F 3/121; G06F 3/1212; G06F 3/1236; G06F 3/1267; G06F 3/1268; G06F 3/1285; G06F 3/1291
See application file for complete search history.

(56) References Cited

U.S. PATENT DOCUMENTS

| | | | |
|---|---|---|---|
| 2003/0179531 A1* | 9/2003 | Yamaguchi | ............... H04L 9/40 361/115 |
| 2006/0031186 A1* | 2/2006 | Yokokura | ............... H04L 69/40 |
| 2016/0080200 A1* | 3/2016 | Ishii | .................... H04L 61/5069 709/211 |
| 2016/0112583 A1* | 4/2016 | Oguma | ................. G06F 3/1267 358/1.15 |
| 2017/0034390 A1* | 2/2017 | Tokunaga | .......... H04N 1/32523 |
| 2018/0032298 A1 | 2/2018 | Murata | |

FOREIGN PATENT DOCUMENTS

JP  2018-018318 A  2/2018

* cited by examiner

*Primary Examiner* — Huo Long Chen
(74) *Attorney, Agent, or Firm* — ScienBiziP, P.C.

(57) ABSTRACT

A printing control system includes: parent units and child units connected together through a network, the parent units including a first memory, and the child units including: a second memory; a job list request provider that transmits a job list request to connectable parent units and a job list response obtainer that obtains a job list response sent back. If a first child unit detects a parent unit not sending back the job list response within a predetermined time period, the first child unit stores, in a non-response parent unit information item, the parent unit not sending back the job list response, and when the first child unit transmits the job list request at a next time, the first child unit transmits the job list request to a parent unit other than the parent unit stored in the non-response parent unit information item.

12 Claims, 19 Drawing Sheets

FIG.4A

| | SELF-SETTING INFORMATION ITEM | 31 |
|---|---|---|
| 1 | IDENTIFICATION INFORMATION ITEM (APPARATUS NAME) | P01 |
| 2 | APPARATUS TYPE | PARENT UNIT |
| 3 | IP ADDRESS | 192.168.10.1 |

FIG.4B

| | SELF-SETTING INFORMATION ITEM | 71 |
|---|---|---|
| 1 | IDENTIFICATION INFORMATION ITEM (APPARATUS NAME) | C001 |
| 2 | APPARATUS TYPE | CHILD UNIT |
| 3 | IP ADDRESS | 192.168.10.51 |

FIG.5A

| CHILD UNIT MANAGEMENT INFORMATION ITEM 32 | | |
|---|---|---|
| | CHILD UNIT IDENTIFICATION INFORMATION ITEM | IP ADDRESS |
| 1 | C001 | 192.168.10.51 |
| 2 | C002 | 192.168.10.52 |
| 3 | C003 | 192.168.10.53 |
| 4 | C004 | 192.168.10.54 |
| 5 | C005 | 192.168.10.55 |
| 6 | C006 | 192.168.10.56 |

FIG.5B

| PARENT UNIT CONNECTION INFORMATION ITEM 72 | | |
|---|---|---|
| | PARENT UNIT IDENTIFICATION INFORMATION ITEM | IP ADDRESS |
| 1 | P01 | 192.168.10.1 |
| 2 | P02 | 192.168.10.2 |
| 3 | P03 | 192.168.10.3 |

FIG.6

| PRINT INFORMATION ITEM | | 33 |
|---|---|---|

| 1 | USER NAME | US1111 |
|---|---|---|
| 2 | JOB NAME | F101 |
| 3 | DATE | 2020.09.11 |
| 4 | PRINT SETTING | COLOR<br>PAPER SIZE:A4<br>NUMBER OF COPIES:1 |

(PRINT DATA ITEM)

| 1 | USER NAME | US2222 |
|---|---|---|
| 2 | JOB NAME | F202 |
| 3 | DATE | 2020.09.12 |
| 4 | PRINT SETTING | BLACK AND WHITE<br>PAPER SIZE:A4<br>NUMBER OF COPIES:3 |

(PRINT DATA ITEM)

FIG.7

| JOB LIST REQUEST | | 73 |
|---|---|---|

| 1 | REQUEST APPARATUS NAME | C006 |
|---|---|---|
| 2 | DESTINATION PARENT UNIT NAME | P01 |
| 3 | USER NAME | US1111 |
| 4 | REQUEST DETAIL | JOB LIST OF USER |

| 1 | REQUEST APPARATUS NAME | C006 |
|---|---|---|
| 2 | DESTINATION PARENT UNIT NAME | P02 |
| 3 | USER NAME | US1111 |
| 4 | REQUEST DETAIL | JOB LIST OF USER |

FIG.8

| | | |
|---|---|---|
| JOB LIST RESPONSE | | 35 |

| 1 | PARENT UNIT NAME | P02 |
|---|---|---|
| 2 | DESTINATION CHILD UNIT NAME | C006 |
| 3 | USER NAME | US1111 |
| 4 | PRESENCE OF JOB LIST | YES |
| 5 | SAVED JOB NAME | F101<br>F102<br>F103 |

| 1 | PARENT UNIT NAME | P03 |
|---|---|---|
| 2 | DESTINATION CHILD UNIT NAME | C006 |
| 3 | USER NAME | US1111 |
| 4 | PRESENCE OF JOB LIST | NO |
| 5 | SAVED JOB NAME | — |

FIG.9

| | PRINT INFORMATION REQUEST | 75 |
|---|---|---|

| 1 | CHILD UNIT NAME | C006 |
|---|---|---|
| 2 | DESTINATION PARENT UNIT NAME | P02 |
| 3 | USER NAME | US1111 |
| 4 | REQUEST JOB NAME | F101,F103 |
| 5 | REQUEST DETAIL | PRINT FILE |

| 1 | CHILD UNIT NAME | C004 |
|---|---|---|
| 2 | DESTINATION PARENT UNIT NAME | P01 |
| 3 | USER NAME | US2222 |
| 4 | REQUEST JOB NAME | F201 |
| 5 | REQUEST DETAIL | PRINT FILE |

FIG.10

PRINT RESPONSE INFORMATION ITEM  37

PRINT INFORMATION ITEM {

| 1 | PARENT UNIT NAME | P02 |
|---|---|---|
| 2 | DESTINATION CHILD UNIT NAME | C006 |
| 3 | USER NAME | US1111 |
| 4 | PRINT JOB NAME | F101, F103 | (PRINT DATA ITEM)
| 5 | DATE | 2020.09.11 |
| 6 | PRINT SETTING | COLOR PAPER SIZE:A4 NUMBER OF COPIES:1 |

FIG.11

NON-RESPONDING PARENT UNIT INFORMATION ITEM  77

| 1 | PARENT UNIT NAME | P02 |
|---|---|---|
| 2 | TIMER T2 REMAINING TIME PERIOD | 10 MINUTES |

FIG.12

RESPONSE CHECK TIME PERIOD (TIMER T1)  78

| TIMER T1 | 15 SECONDS |
|---|---|

FIG.13

REQUEST ON-HOLD TIME PERIOD (TIMER T2)  79

| TIMER T2 | 10 MINUTES |
|---|---|

FIG.14A  JOB LIST DISPLAY SCREEN

SELECT A FILE FROM THE JOB LIST BELOW TO PRINT OUT, AND PRESS PRINT START.

| USER NAME | US1111 |
|---|---|
| SAVING PARENT UNIT NAME | P02 |

| JOB LIST | JOB NAME | DATE | SELECTION BOX |
|---|---|---|---|
| 1 | DAILY REPORT F101 | 2020.07.21 | ✓ |
| 2 | PROPOSAL F102 | 2020.07.21 |  |
| 3 | REPORT F103 | 2020.07.21 | ✓ |

SELECT ALL   CLEAR SELECTION   CHANGE SETTING   PRINT START

FIG.14B  JOB LIST DISPLAY SCREEN

SELECT A FILE FROM THE JOB LIST BELOW TO PRINT OUT, AND PRESS PRINT START.

| USER NAME | US1111 |
|---|---|
| SAVING PARENT UNIT NAME | P02 |

| JOB LIST | JOB NAME | DATE | SELECTION BOX |
|---|---|---|---|
| 1 | DAILY REPORT F101 | 2020.07.21 | ✓ |
| 2 | PROPOSAL F102 | 2020.07.21 |  |
| 3 | REPORT F103 | 2020.07.21 | ✓ |

SELECT ALL   CLEAR SELECTION   CHANGE SETTING   PRINT START

WARNING : PARENT UNIT P3 SUSPENDED

PRINTING CONTROL SYSTEM

CROSS-REFERENCE TO RELATED APPLICATION

The present application claims priority from Japanese Application JP2021-047334, the content of which is hereby incorporated by reference into this application.

BACKGROUND OF THE INVENTION

1. Field of the Invention

An aspect of the present invention relates to printing control systems, and, in particular, to a printing control system including a plurality of image forming apparatuses connected together through a network. The printing control system allows an image forming apparatus to store print data created by a user, and another image forming apparatus to print out the print data.

2. Description of the Related Art

Conventional printing systems known in the art include a plurality of image forming apparatuses connected together through a network. In such a printing system, a specific one of the image forming apparatuses (a parent unit) stores print data DATA transmitted from an information terminal of a user. When the user operates an image forming apparatus (a child unit), different from the specific image forming apparatus, to print out the print data DATA, the child unit can ask the parent unit to transmit the print data DATA to the child unit, and print out the print data DATA.

For example, Japanese Unexamined Patent Application Publication No. 2018-018318 discloses a printing system. In the printing system, a user terminal transmits a print job to one of image forming apparatuses set as a parent unit, and the parent unit stores the print job. Another one of the image forming apparatuses set as a child unit previously stores the IP address of the parent unit. When the user moves to a position where the child unit is placed and enters user information through the child unit to log in to the parent unit, the child unit obtains the print job from the parent unit. On a print instruction from the user, the child unit prints out the print data included in the print job.

SUMMARY OF THE INVENTION

In the above conventional printing system, the one specific image forming apparatus is designated as the parent unit to store the print data. Hence, if each of the child units previously stores information regarding the parent unit, one of the child units to print out the print data establishes a connection to the parent unit so that the print data can be easily obtained.

However, if the printing system includes a plurality of parent units and child units, a child unit to execute a print job might not be able to identify which parent unit stores the print data.

For example, if the child unit can establish a connection to five parent units, the child unit has to send an inquiry to each of the five parent units whether the parent unit stores the print data, and has to wait for a reply (a response to the inquiry) from each of the parent units to find out the parent unit storing the print data.

The more parent units the printing system has, the more time it takes to find out the parent unit storing the print data.

Moreover, after the child unit to execute a print job transmits the inquiry to each of the parent units, a time is set on a timer to wait for a reply from the parent units. If some of the parent units are broken or unable to communicate due to maintenance, such parent units cannot send a reply. Hence, the user has to wait for the elapse of the time set on the timer.

For example, if there is a broken parent unit when the timer is set for 10 seconds, the broken parent unit does not send a reply. Hence, the user cannot proceed to a succeeding operation with a child unit to execute a print job, and has to wait for 10 seconds until the timer times out. Such a trouble is inconvenient for the user.

Moreover, the Japanese Unexamined Patent Application Publication No. 2018-018318 discloses that if a user can properly log in to a parent unit through a child unit that the user visits, the child unit obtains from the parent unit a print job including print data of the user. If the user does not give a print instruction on the print job that is supposed to be executed on all or some of the files included in the print job, the print job transmitted from the parent unit to the child unit ends up in a waste of communication processing.

In view of the above circumstances, an aspect of the present invention provides a printing control system including a plurality of image forming apparatuses connected together through a network. When the image forming apparatuses include a plurality of parent units capable of storing print data created by a user, even if a parent unit cannot establish a connection because of, for example, malfunction, the user can use an image forming apparatus not storing the print data to print out the print data easily and quickly. Hence, the printing control system can be highly convenient for the user.

An aspect of the present invention relates to a printing control system including: a plurality of image forming apparatuses set as parent units; and a plurality of image forming apparatuses set as child units, all of which are connected together through a network, each of the parent units including a first memory that stores one or more print data items, and each of the child units including: a second memory that stores a parent unit connection information item identifying connectable parent units included in the parent units; a job list request provider that transmits a job list request to the connectable parent units stored in the parent unit connection information item, the job list request requesting the connectable parent units to transmit a job list including a job name of the one or more print data items; and a job list response obtainer that obtains a job list response sent back from the connectable parent units to which the job list request has been transmitted, wherein if a first child unit included in the child units and transmitting the job list request detects a parent unit included the connectable parent units and not sending back the job list response within a predetermined time period, the first child unit stores, in a non-response parent unit information item, the parent unit not sending back the job list response, and when the first child unit transmits the job list request at a next time, the first child unit transmits the job list request to a parent unit, among the connectable parent units stored in the parent unit connection information item, other than the parent unit stored in the non-response parent unit information item.

Moreover, the first child unit: stores, in the non-response parent unit information item, the parent unit not sending back the job list request, and then, activates a timer to time a request on-hold time period limiting the transmission of the job list request; until the request on-hold time period elapses, transmits the job list request to the parent unit, among the connectable parents unit stored in the parent unit connection information item, other than the parent unit stored in the non-response parent unit information item; and after the request on-hold time period has elapsed, transmits the job list request to the connectable parent units stored in the parent unit connection information item.

Furthermore, each of the child units further includes a job list display unit that causes the job list, included in the job list response obtained by the job list response obtainer, to display.

Moreover, the job list response obtainer obtains the job list response sent back from the parent unit to which the job list request has been transmitted, and then, the job list display unit causes the job list included in the obtained job list response to display.

Furthermore, the first child unit stores, in the non-response parent unit information item, the parent unit not sending back the job list request, and activates a timer to time a request on-hold time period limiting the transmission of the job list request, and then, the job list display unit causes a warning of the parent unit not sending back the job list response to display.

Moreover, if the first child requests the connectable parent units to transmit the job list having the job name of the one or more print data items stored by a specific user, the job list request provider of the first child unit transmits the job list request, including an identification information item on the specific user, to the connectable parent units stored in the parent unit connection information item, and when the connectable parent units obtain the job list request, if the one or more print data items stored on the first memory include a print data item stored by the specific user identified with an identification information item, on the specified user, included in the job list request, the connectable parent units transmit, to the first child unit that has transmitted the job list request, a job list response including a job list having a job name of the print data item stored by the specific user.

Furthermore, if the first child requests the connectable parent units to transmit the job list having the job name of the one or more print data items stored by a specific user, the job list request provider of the first child unit transmits the job list request, including an identification information item on the specific user, to the connectable parent units stored in the parent unit connection information item, and when the connectable parent units obtain the job list request, if the one or more print data items stored on the first memory do not include a print data item stored by the specific user identified with an identification information item, on the specified user, included in the job list request, the connectable parent units transmit, to the first child unit that has transmitted the job list request, a job list response indicating there is no job list having a job name of the print data items stored by the specific user.

Moreover, the first child unit further includes: a print information request provider that transmits a print information request to a parent unit included in the connectable parent units and transmitting the job list response including the job list when a job name of a print data item to be printed out with the first child unit is selected from the job list caused to be displayed by the job list display unit, the print information request including the job name of the selected print data item and requesting transmission of the selected print data item to the first child unit; and a print information obtainer that obtains a print response information item that is a reply to the print information request, and when the first child unit transmits the print information request to the parent unit, and the parent unit sends back, to the first child unit, the print response information item including the selected print data item, the first child unit prints out the print data item included in the print response information item obtained by the print information obtainer.

Furthermore, the first child unit further includes a console through which the job list request is transmitted to the connectable parent units stored in the parent unit connection information item, when a user operates the console to request the transmission of the job list request.

Moreover, an aspect of the present invention provides an image forming apparatus set as a parent unit included in the printing control system according to the above printing control system.

Furthermore, an aspect of the present invention provides an image forming apparatus set as a parent unit included in the printing control system according to the above printing control system.

Moreover, the present provides a method for controlling printing on a printing control system including a plurality of image forming apparatuses set as parent units and a plurality of image forming apparatuses set as child units, all of which are connected together through a network. The method includes: a saving step saving one or more print data items on at least any given first parent unit included in the parent units; a job list requesting step transmitting a job list request from any given first child unit, included in the child units, to connectable parent units included in the parent units and set in a parent unit connection information item previously stored on the any given first child unit, the job list request requesting the connectable parent units to transmit a job list, including a job name of the one or more print data items, to the any given first child unit; a first timer activating step allowing the any given child unit to activate a timer timing a predetermined response check time period after the any given child unit has transmitted the job list request; a job list request obtaining step allowing the parent units set in the parent unit connection information item to obtain the job list request; a print job response step allowing the any given first parent unit saving the one or more print data items to transmit, to the any given first child unit, a job list response including a job list including a job name of the saved one or more print data items, the job list response serving as a reply to the obtained job list request; a job list response obtaining step allowing the any given first child unit to obtain the job list response sent back from the any given parent unit to which the job list request has been transmitted; and a storing step allowing the any given first child unit to store, in a non-response parent unit information item, a parent unit included in the connectable parent units and not sending back the job list response, if the any given child unit detects the parent unit by the response check time period elapses, wherein when the any given first child unit executes the job list requesting step to transmit the job list request at a next time, the any given first child unit transmits the job list request to a parent unit, among the connectable parent units stored in the parent unit connection information item, other than the parent unit stored in the non-response parent unit information item.

Moreover, in an aspect of the present invention, the method further includes a second timer activating step allowing the any given first child unit to activate a timer timing a request on-hold time period after the storing step, the request on-hold time period limiting the transmission of the job list request, wherein when the any given first child unit carries out the job list requesting step to transmit the job list request at the next time, until the request on-hold time period elapses, the any given first child unit transmits the job list request to the parent unit, among the connectable parents unit stored in the parent unit connection information item, other than the parent unit stored in the non-response parent unit information item, and after the request on-hold time period has elapsed, the any given first child unit transmits the job list request to the connectable parent units stored in the parent unit connection information item.

Moreover, an aspect of the present invention provides a method for controlling printing on a printing control system including a plurality of image forming apparatuses set as parent units and a plurality of image forming apparatuses set as child units, all of which are connected together through a network. The method includes: storing one or more print data items on the parent units; storing, on the child units, a parent unit connection information item identifying connectable parent units included in the parent units; transmitting, by the child units, a job list request to the connectable parent units stored in the parent unit connection information item, the job list request requesting the connectable parent units to transmit a job list, including a job name of the one or more print data items, to the child units; obtaining, by the child units, the job list response sent back from the connectable parent units to which the job list request has been transmitted; if the child units transmitting the job list request detect a parent unit included the connectable parent units and not sending back the job list response within a predetermined time period, storing, by the child units, the parent unit in a non-response parent unit information item; and when the child units transmit the job list request at a next time, transmitting the job list request to a parent unit, among the connectable parent units stored in the parent unit connection information item, other than the parent unit stored in the non-response parent unit information item.

In an aspect of the present invention, each of the child units includes a job list request provider that transmits a job list request to the parent units stored in the parent unit connection information item, and each of the parent units includes a print job response provider that transmits, to the child unit, a job list response as a reply to the job list request, the job list response including a job list including a job name of the stored one or more print data items. If the child unit transmitting the job list request detects a parent unit not sending back the job list response within a predetermined time period, the child unit stores, in a non-response parent unit information item, the parent unit not sending back the job list response. When the child unit transmits the job list request at a next time, the child unit transmits the job list request to a parent unit, among the connectable parent units stored in the parent unit connection information item, other than the parent unit stored in the non-response parent unit information item. Hence, even if there is a parent unit suspended and unable to connect to the child units because of, for example, breakdown or maintenance, the above features allow the user to use a child unit different from a parent unit storing the printed data items in order to print out the print out data items easily and quickly, making it possible to increase convenience for the user.

BRIEF DESCRIPTION OF THE DRAWINGS

FIG. 4A is a table showing an example of information (a self-setting information item) to be stored on a memory of a parent unit among the image forming apparatuses according to the present invention;

FIG. 4B is a table showing an example of information (a self-setting information item) to be stored on a memory of a child unit among the image forming apparatuses according to the present invention;

FIG. 5A is a table showing an example of information (a child unit management information item) to be stored on the memory of a parent unit among the image forming apparatuses according to the present invention;

FIG. 5B is a table showing an example of information (a parent unit connection information item) to be stored on the memory of a child unit among the image forming apparatuses according to the present invention;

FIG. 6 is a table showing an example of information (a print information item) to be stored on the memory of a parent unit among the image forming apparatuses according to the present invention;

FIG. 7 is a table showing an example of information (a job list request) to be stored on the memory of a child unit among the image forming apparatuses according to the present invention;

FIG. 8 is a table showing an example of information (a job list response) to be stored on the memory of a parent unit among the image forming apparatuses according to the present invention;

FIG. 9 is a table showing an example of information (a print information request) to be stored on the memory of a child unit among the image forming apparatuses according to the present invention;

FIG. 10 is a table showing an example of information (a print response information item) to be stored on the memory of a parent unit among the image forming apparatuses according to the present invention;

FIG. 11 is a table showing an example of information (a non-responding parent unit information item) to be stored on the memory of a child unit among the image forming apparatuses according to the present invention;

FIG. 12 is a table showing an example of information (a response check time period) to be stored on the memory of a child unit among the image forming apparatuses according to the present invention;

FIG. 13 is a table showing an example of information (a request on-hold time period) to be stored on the memory of a child unit among the image forming apparatuses according to the present invention;

FIG. 14A is a view showing an example of a job list display screen to be displayed on a display of a child unit among the image forming apparatuses according to the present invention;

FIG. 14B is a view showing an example of a job list display screen to be displayed on the display of a child unit among the image forming apparatuses according to the present invention;

DETAILED DESCRIPTION OF THE INVENTION

Hereinafter described are embodiments of the present invention, with reference to the drawings. Note that the description of the examples below shall not limit the present invention.

A printing control system according to an aspect of the present invention includes a plurality of image forming apparatuses connected to a network.

In particular, the printing control system includes a plurality of image forming apparatuses set as parent units and a plurality of image forming apparatuses set as child units, all of which are connected together through a network.

An image forming apparatus (hereinafter also referred to as a multifunction peripheral, or an MFP) processes image data. The image forming apparatus is an electronic device capable of copying, printing, document scanning, document editing, document saving, document transmitting (faxing), and performing communications.

All of the image forming apparatuses have the same image processing functions. Some of the image forming apparatuses are initially set by default to parent units, and others to child units.

An image forming apparatus serving as a parent unit (hereinafter simply referred to as a parent unit) has a function in particular to temporarily store print data transmitted from information processing apparatuses such as a personal computer and a mobile terminal of a user.

Meanwhile, an image forming apparatus serving as a child unit (hereinafter simply referred to as a child unit) has functions to obtain the print data and print out the print data on, for example, printing paper.

Moreover, similar to the child unit, the parent unit also has the function to print out the print data on, for example, printing pater.

Furthermore, information processing apparatuses such as a personal computer and a mobile terminal of the user are also included in the printing control system, and serve as devices to transmit the print data to the parent unit.

In addition, communications processing executed by the printing control system according to an aspect of the present invention is also applicable to a communications control system including a plurality of information processing apparatuses connected to a network. In the communications control system, the information processing apparatuses serve as a plurality of parent units and a plurality of child units connected together in association with each other, and transmit and receive information such as print data therebetween.

Examples of the information processing apparatuses include various apparatuses such as a personal computer, a communications apparatus, a display device, and an image forming apparatus. The embodiments below are applicable to any of the information processing apparatuses.

Figure 1:
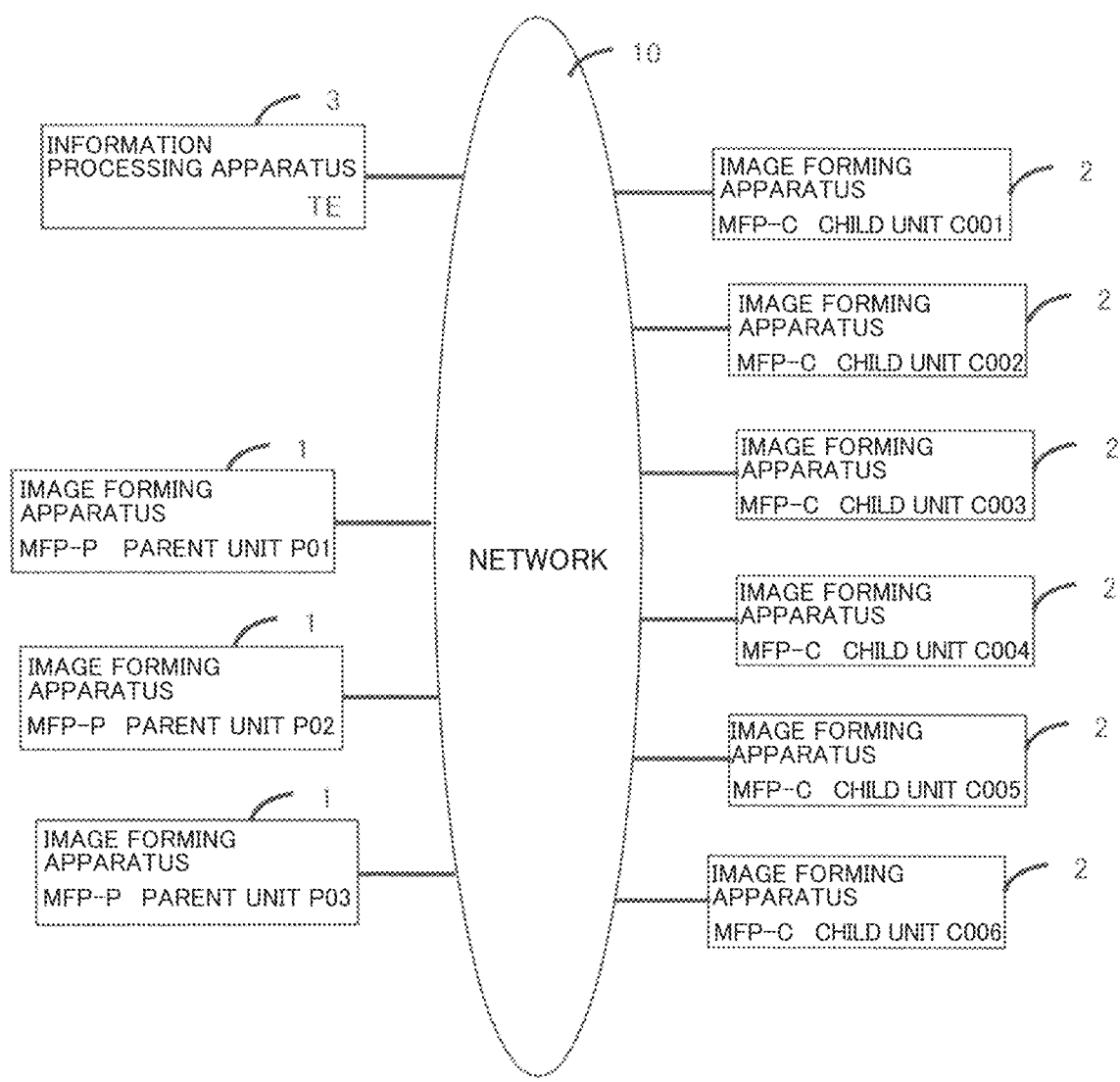
FIG. 1 is a diagram illustrating an example of a printing control system according to the present invention.

Configuration of the Printing Control System According to an Aspect of the Present Invention FIG. 1 is a diagram illustrating an example of the printing control system according to the present invention.

As illustrated in FIG. 1, the printing control system according to an aspect of the present invention includes: parent units (MFP-P) 1; child units (MFP-C) 2; and an information processing apparatus (TE) 3, all of which are connected together through a network 10.

As described above, each of the parent units (MFP-P) 1 is an image forming apparatus capable of temporarily storing print data. The printing control system includes one or more parent units (P01, P02, and, P03).

As described above, each of the child units (MFP-C) 2 is an image forming apparatus capable of outputting the print data. The printing control system includes one or more child units (C001 to C006).

The information processing apparatus (TE) 3, owned by a user who prints out the print data, stores, for example, document information created by the user and image information obtained by the user.

In printing out the document information, the user may directly transmit the document information to the image forming apparatus to print out the document.

Note that if a plurality of document information items are to be printed out later at a time, the document information items may be, for example, converted into print data items in a printable format, transmitted from the information processing apparatus (TE) 3 to a predetermined parent unit 1, and stored on the parent unit 1.

The parent unit 1 manages print data for each of the users. One or more print data items temporarily stored are referred to as a print job for each user.

The parent units 1, the child units 2, and the information processing apparatus 3 can perform data communications with one another through the network 10.

The number of the parent units 1, the child units 2, and the information processing apparatus 3 to be connected to the network 10 shall not be limited to the number in FIG. 1. Any given number of the parent units 1, the child units 2, and the information processing apparatus 3 may be connected to the network 10.

The network 10 may be any given conventional communications network such as a local area network (LAN) and a wide area communications network including the Internet. The communications may be held either by wire or wirelessly.

Configuration of a Parent Unit Among the Image Forming Apparatuses

Figure 2:
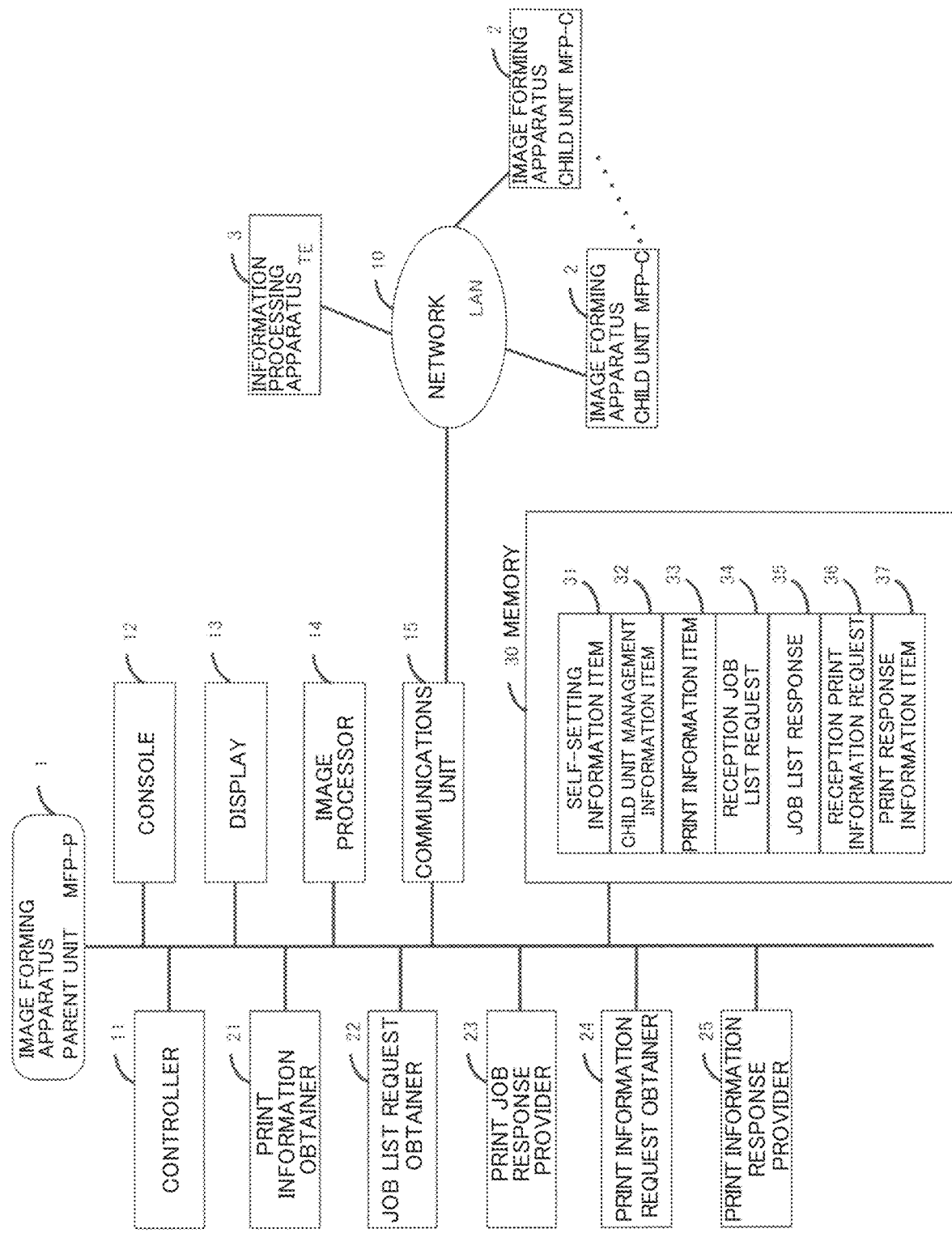
FIG. 2 is a block diagram illustrating a configuration of an example of a parent unit among image forming apparatuses according to the present invention.

FIG. 2 is a block diagram illustrating a configuration of an example of a parent unit among image forming apparatuses according to an aspect of the present invention.

An image forming apparatus serving as a parent unit (MFP-P) 1 is an electronic device capable of copying, printing, document scanning, document editing, document saving, document transmitting (faxing), and performing communications.

As illustrated in FIG. 2, through the network 10 such as a LAN, the parent unit 1 can connect to the child units 2 and the information processing apparatus 3 to perform data communications.

In FIG. 2, the parent unit (MFP-P) 1 mainly includes: a controller 11; a console 12; a display 13; an image processor 14; a communications unit 15; a print information obtainer 21; a job list request obtainer 22; a print job response provider 23; a print information request obtainer 24; a print information response provider 25; and a memory 30.

The memory 30 corresponds to a first memory storing one or more print data items described above. The print data item is temporarily saved on the memory 30 until printed out by any parent units or child units. After printed out, the print data item is deleted from the memory 30.

The controller 11 controls operations of such constituent features as the console and the image processor. Mainly, the controller 11 is a microcomputer including a central processing unit (a CPU), a read-only memory (a ROM), a random-access memory (a RAM), an input-output (I/O) controller, and a timer.

The CPU organically operates various kinds of hardware in accordance with a control program previously stored on, for example, a ROM, and executes a function of an aspect of the present invention such as an image processing function.

The console 12 is used by a user of the parent unit to input information. The console 12 is an input device for the user to perform a predetermined input operation to operate the parent unit. For example, the console 12 is used to input such information as a character and a selection of a function. The console 12 includes a keyboard, a mouse, and a touch panel.

The keys that the user operates include an operation start key, a function selection key, and a setting key.

For example, the user performs an input operation through the touch panel and the start key for scanning operation to cause the parent unit to carry out such functions as a print item setting function and a print function.

The display 13 notifies the user of information necessary to carry out the functions and of results of the carried out functions. For example, if the display 13 is an LCD or an organic EL display, and the console 12 is a touch panel, the display 13 is provided on the touch panel.

Using, for example, characters, signs, figures, images, icons, animations, and moving images, the display 13 displays, for example, settings of setting items to be used for, for example, a print job of an image forming apparatus, information necessary to carry out such a function as a document scanning function, an operation screen for a selected function, and an operation screen for setting a print item.

The image processor 14 carries out an image forming function; that is, a main function of an image forming apparatus serving as the parent unit. The image processor 14 mainly includes: an image input unit; an image formation unit; and an image output unit.

The image input unit mainly inputs predetermined image data. The image formation unit mainly converts the input image data into information in, for example, a printable form. The image output unit mainly outputs, for example, the formed print information to, for example, printing paper.

The image input unit inputs image data of a document including, for example, an image, a character, and a figure. The image input unit, for example, scans a document placed on, for example, a platen.

The image input unit is a scanner (a reader) scanning a document including information.

To scan a document, the image forming apparatus includes: a document placing platform (a platen) on which the document is placed; and a document cover to hold the document.

The image forming apparatus may also include an automatic document feeder (an ADF) housing a plurality of documents, and automatically feeding and scanning the documents one by one.

In such a case, the documents including, for example, images are read by a scanner, and the image data of the documents is stored on the memory 30.

There are various techniques to input image information.

For example, the image information to be input may be transmitted through the network 10 from the information processing apparatus TE such as a personal computer and a mobile terminal of the user, and a server.

Moreover, an interface to connect to an external storage medium such as a USB memory corresponds to the image input unit.

The image information may also be input as follows. An electronic data file of, for example, image information to be input is previously stored on an external storage medium such as a USB memory. The USB memory is connected to an input interface such as a USB terminal, and the user carries out a predetermined input operation on the console 12. Hence, a desired electronic data file is read out of the USB memory and stored on the memory 30 as input image data.

In printing the input image data on a recording medium, for example, the image formation unit typically and sequentially carries out such steps as charging, exposing, developing, transferring, cleaning, removing static charge, and fixing to form the input image data on the recording medium.

In developing, toner is supplied from a toner cartridge to a developing apparatus. An electrostatic latent image is formed and developed on a surface of a charged photoconductive drum. Hence, a toner image is formed to correspond to the electrostatic latent image. The toner image formed on the surface of the photoconductive drum is transferred to the recording medium by a transfer apparatus. After that, a fixing apparatus heats and fixes the toner image on the recording medium.

Moreover, the image formation unit converts the input image data into transferable and displayable information.

The image output unit outputs the formed input image data. The image output unit corresponds to, for example, a printer printing information such as the input image data. The image output unit prints out input image data, in a scanned document, on predetermined printing paper (in print form).

Note that the form of outputting the input image data shall not be limited to printing, and includes storing and faxing the input image data in the scanned document.

For example, outputting the image also includes storing the input image data, in the scanned document, on an external storage medium such as a USB, and transmitting the input image data to another information processing apparatus and a server through a network such as the Internet.

The communications unit 15 transmits and receives information through a network, and performs data communications with an image forming apparatus set as a child unit, a mobile terminal of the user, and another information processing apparatus.

For example, the communications unit 15 receives an electronic data file transferred from the information processing apparatus TE such as a personal computer and a mobile terminal of the user, and a server.

Moreover, the communications unit 15 transfers the input image data, input into the parent unit 1, to an external storage device (such as a USB memory) connected to the parent unit 1, and transmits the input image data, through the network 10, to a child unit and to the information processing apparatus TE such as a personal computer of the user and a server into which the document is input.

In particular, as will be described later in an aspect of this invention, the communications unit 15 of a parent unit transmits to a child unit a job list response and a print response information item, and receives from a child unit a job list request and a print information request.

The print information obtainer 21 obtains, from the information processing apparatus TE, data that the user would like to print out (also referred to as a print data item, a print file, or a print job) such as a document and an image created by the user.

Moreover, for example, the print information obtainer 21 associates a print data item with, for example, a job name, a user name, a date and a time of creation, and a print setting of the print data item, and stores on the memory 30 the print data item as a print information item.

A print information item 33 to be stored on the memory 30 is, for example, information illustrated in FIG. 6 to be shown later.

The information processing apparatus TE is, for example, a mobile terminal of the user. The user creates a print data item with the mobile terminal TE. When the user desires to create a print data item and temporarily store the created print data item, the user operates the mobile terminal TE to transmit the print data item to a predetermined parent unit.

The information processing apparatus TE previously stores information (e.g., an IP address) on one or more of the parent units to be connectable.

If two or more of the parent units are connectable using the information processing apparatus TE, the user may either previously designate a parent unit to which the print data item is transmitted, or prioritize the parent units to which the print data item is transmitted.

Alternatively, every time the print data item is transmitted, the user may select from among the parent units a desired parent unit to which the print data item is transmitted.

The job list request obtainer 22 obtains a job list request transmitted from a child unit or another parent unit.

The job list request in FIG. 7 to be shown later is information to request transmission of a job list to, for example, a child unit that has transmitted a request of the job list. The job list includes a job name of a print data item temporarily stored on the parent unit.

For example, when the user operates any given first child unit among the child units to select the print function, the first child unit transmits a job list request requesting to transmit, to the first child unit, a job list including a job name of a print data item temporarily stored. Hence, the parent unit obtains the job list request transmitted from the first child unit.

The parent unit obtained the job list request creates a job list including the job name of the print data item temporarily stored on the parent unit.

As will be described later, the obtained job list request includes a user name. The job list to be created includes the job name of the print data item stored on the parent unit by the user of the user name. If two or more print data items are stored on the parent unit, the job list to be created includes the job names of the two or more print data items.

The job list does not include a file per se; that is, an actual print data item.

Note that the job list is not created if the parent unit obtained the job list request does not have the print data item that the user of the user name stores.

In response to the obtained job list request, the print job response provider 23 transmits a job list response to the child unit that has transmitted the job list request and to another parent unit. The job list response includes the job list including the job name of the print data item temporarily stored on the memory 30.

The job list is created in accordance with the obtained job list request.

The job list response is information in FIG. 8 to be shown later.

If the parent unit has a print data item stored by the user of the user name included in the job list request, the job list response includes a job list including a job name (a saved job name) of the stored print data item.

Meanwhile, if the parent unit does not have a print data item stored by the user of the user name included in the job list request, the job list response includes information indicating that there is no job list of the user.

The print job response provider 23 transmits the job list response to, for example, the child unit that has transmitted the job list request, and notifies the child unit whether the parent unit has the print data item stored by the user. If the parent unit has the print data item, the job list response notifies the child unit of the job list including the job name of the print data item stored by the user.

The print information request obtainer 24 obtains a print information request transmitted from a child unit or another parent unit.

The print information request is a data item requesting transmission of a print data item stored on the parent unit to the child unit that has transmitted the print information request or to another parent unit. The print information request is information in FIG. 9 to be shown later.

The print information request includes a job name (a request job name) of a print data item to be transmitted.

When the parent unit obtains the print information request, the parent unit reads, from the memory 30, the print data item identified with a job ID, and transmits the print data item to the child unit that has transmitted the print information request.

The print information response provider 25 transmits a print response information item to the child unit that has transmitted the print information request, or to another parent unit. The print response information item, a reply to the obtained print information request, includes a print data item that is identified with the job ID of the print data item selected with the child unit, and that is stored on the memory 30 of the parent unit.

Here, the print information response provider 25 creates the print response information item including the print data item to be identified with the job ID included in the obtained print information request.

The print response information item may include the above print information item, as illustrated in FIG. 10 to be shown later.

The child unit receiving the print response information item obtains a print data item from the print information item included in this print response information item, and prints out the print data item on predetermined printing paper.

The memory 30 stores information and a program required to carry out the functions of the parent units of an aspect of the present invention. The memory 30 is, for example, a semiconductor storage element such as a ROM, a RAM, and a flash memory, a storage device such as an HDD and an SDD, and other storage media.

The memory 30 stores, for example, a self-setting information item 31, a child unit management information item 32, the print information item 33, a reception job list request 34, a job list response 35, a reception print information request 36, and a print response information item 37.

The self-setting information item 31 indicates that the image forming apparatus is a parent unit. When this printing control system starts to operate, and when a new parent unit is introduced into the printing control system, the self-setting information item 31 is previously set and stored by a manager of the printing control system.

FIG. 4A is a table showing an example of information (a self-setting information item) to be stored on the memory 30 of a parent unit.

For example, the self-setting information item 31 in FIG. 4A includes, but not limited to, an identification information item, an apparatus type, and an IP address.

The identification information item is to identify the image forming apparatus, and to distinguish the image forming apparatus from another image forming apparatus that belongs to the printing control system. The identification information item is, for example, an apparatus name and a number unique to the apparatus. In FIG. 4A, an identification information item "P01" is set.

The apparatus type is information for setting the image forming apparatus to a parent unit.

As illustrated in FIG. 4A, for example, if the apparatus type "parent unit" is set, the image forming apparatus functions as a parent unit.

The IP address is information assigned to each of the communications appliances connected to the network 10 in order to identify the communications appliance. Commonly, either a global IP address or a private IP address is set for each of the image forming apparatuses.

The self-setting information 31 in FIG. 4A indicates that this parent unit has an IP address "192.168.10.1".

Note that this IP address may be used as the identification information item described above.

The child unit management information item 32 is information on a child unit to be managed with a parent unit, and previously sets a child unit connectable to the parent unit and capable of performing information communications with the parent unit.

FIG. 5A is a table showing an example of information (a child unit management information item) to be stored on the memory 30 of a parent unit.

The child unit management information item in FIG. 5A includes child unit identification information items and IP addresses.

The child unit identification information item identifies a child unit connected to the network. In FIG. 5A, the child unit identification information item indicates a name of a child unit.

The IP address, which also identifies a child unit connected to the network, may be used as the child unit identification information item.

FIG. 5A shows six child unit identification information items (C001 to C006), which means that the six child units can perform information communications with this parent unit.

Note that, in order to perform information communications, and to print out a print data item, with another parent unit, the child unit management information item 32 may be set to store an identification information item as to the other parent unit.

The print information item 33 is on a print data item transmitted from the information processing apparatus TE. The print information item 33 is temporarily stored until any one of the child units or of the parent units finishes printing out the print data item.

This print information item 33 is used to carry out printing with, for example, a child unit.

FIG. 6 is a table showing an example of information (a print information item) to be stored on the memory 30 of a parent unit.

The print information item 33 in FIG. 6 stores a user name, a job name, a date, and a print setting. The print information item 33 also stores a print data per se of the job name.

The first print information item 33 in FIG. 6 stores a print data item stored by a user whose user name is US1111, on Sep. 11, 2020, under a job name of "F101". The print setting of the print data item is "color, paper size: A4, and number of copies: 1".

Moreover, the second information item 33 in FIG. 6 stores a print data item stored by a user whose user name is US2222, on Sep. 12, 2020, under a job name of "F202". The print setting of the print data item is "black and white, paper size: A4, and number of copies: 3".

Note that the details of the print setting can be changed when the print data item is actually printed out later, and the print setting does not have to be included in the print information item 33.

The reception job list request 34, which is information received by the parent unit, is transmitted from a child unit and another parent unit.

The job list request, an information item in FIG. 7 to be shown later, requests the parent unit to transmit a list (a job list) to a child unit that has transmitted the job list request. The job list includes a job name of a print data item temporarily stored on the parent unit.

The job list response 35 is information included in a reply to the job list request.

As can be seen, the job list response 35 includes information indicating that the parent unit does not have a job list of the user designated with the job list request. If the parent unit has a print data item, the job list response 35 includes a job list including the job name of the print data item stored by the designated user. The job list response 35 does not include the print data item per se.

FIG. 8 is a table showing an example of information (a job list response) to be stored on the memory 30 of a parent unit.

The job list response 35 in FIG. 8 includes, but not limited to, a parent unit name, a destination child unit name, a user name, presence of a job list, and a saved job name.

Here, the presence of a job list is information indicating the presence or absence of the print data item stored on the parent unit by the user of the user name. If, for example, the parent unit does not have the print data item, the parent unit cannot create the job list. Hence, the presence of a job list is set to "NO".

Meanwhile, if the parent unit has the print data item stored by the user of the user name, the parent unit can create the job list. Hence, the presence of a job list is set to "YES".

Moreover, if the parent unit has a print data item stored by the user of the user name, the parent unit obtains a saved job name of the print data item temporarily saved. The parent unit then creates a job list including the obtained saved job name.

The job list response 35 in FIG. 8 indicates saved job names included in the job list.

For example, the first job list response 35 in FIG. 8 is transmitted from a parent unit having the parent unit name "P02" to a child unit having the destination child unit name "C006". The job list response 35 indicates a job list of a user whose user name is "US1111", and the job list includes saved job names "F101", "F102", and "F103".

That is, this job list response 35 indicates that the parent unit "P02" temporarily stores three print data items stored by the user "US1111", that the saved job names of the print data items are "F101", "F102", and "F103", and that this job list response 35 is to be transmitted to the child unit C006.

Moreover, the second job list response 35 in FIG. 8 is transmitted from a parent unit having the parent unit name "P03" to a child unit having the destination child unit name "C006". The job list response 35 indicates that there is no job list of a user whose user name is "US1111", and that there is no saved job name included in a job list.

That is, this job list response 35 indicates that the parent unit "P03" does not store a print data item of the user "US1111".

The job list response does not include a print data item per se, making it possible to reduce an amount of communications traffic for the job list response. Moreover, at the moment of transmitting the job list response, a print data item not to be printed out later is not transmitted to a child unit, making it possible to reduce a waste of communication processing.

The reception print information request 36, which is information received by the parent unit, is transmitted from a child unit and another parent unit. The print information request, an information item in FIG. 9 to be shown later, designates a print data item temporarily stored on the parent unit, and requests the parent unit to transmit the print date item to the child unit that has transmitted the print information request.

The print response information item 37 is included in a reply to the print information request.

FIG. 10 is a table showing an example of information (a print response information item) to be stored on the memory 30 of a parent unit.

The print response information item 37 in FIG. 10 includes a parent unit name, a destination child unit name, a user name, a print job name, a date, and a print setting. The print response information item 37 may also include a print data item per se identified with a print job ID. However, the print response information item 38 is not limited to the above information items.

The user name, the print job name, the date, the print setting, and the print data item correspond to the print information item 33 stored on the parent unit.

In FIG. 10, for example, the print response information item 37 is transmitted from a parent unit having the parent unit name "P02" to a child unit having the destination child unit name "C006". The print response information item 37 indicates to include two print data items stored by the user of the user name "US1111", with a print setting of "color, paper size: A4, and number of copies: 1". The two print data items has the print job names of "F101" and "F103".

As can be seen, the print response information item 37 is transmitted to, for example, a child unit that has transmitted a print information request. The child unit receiving the print response information item 37 prints out, on predetermined printing paper, a print data item included in the print response information item 37.

Configuration of a Child Unit Among the Image Forming Apparatuses

Figure 3:
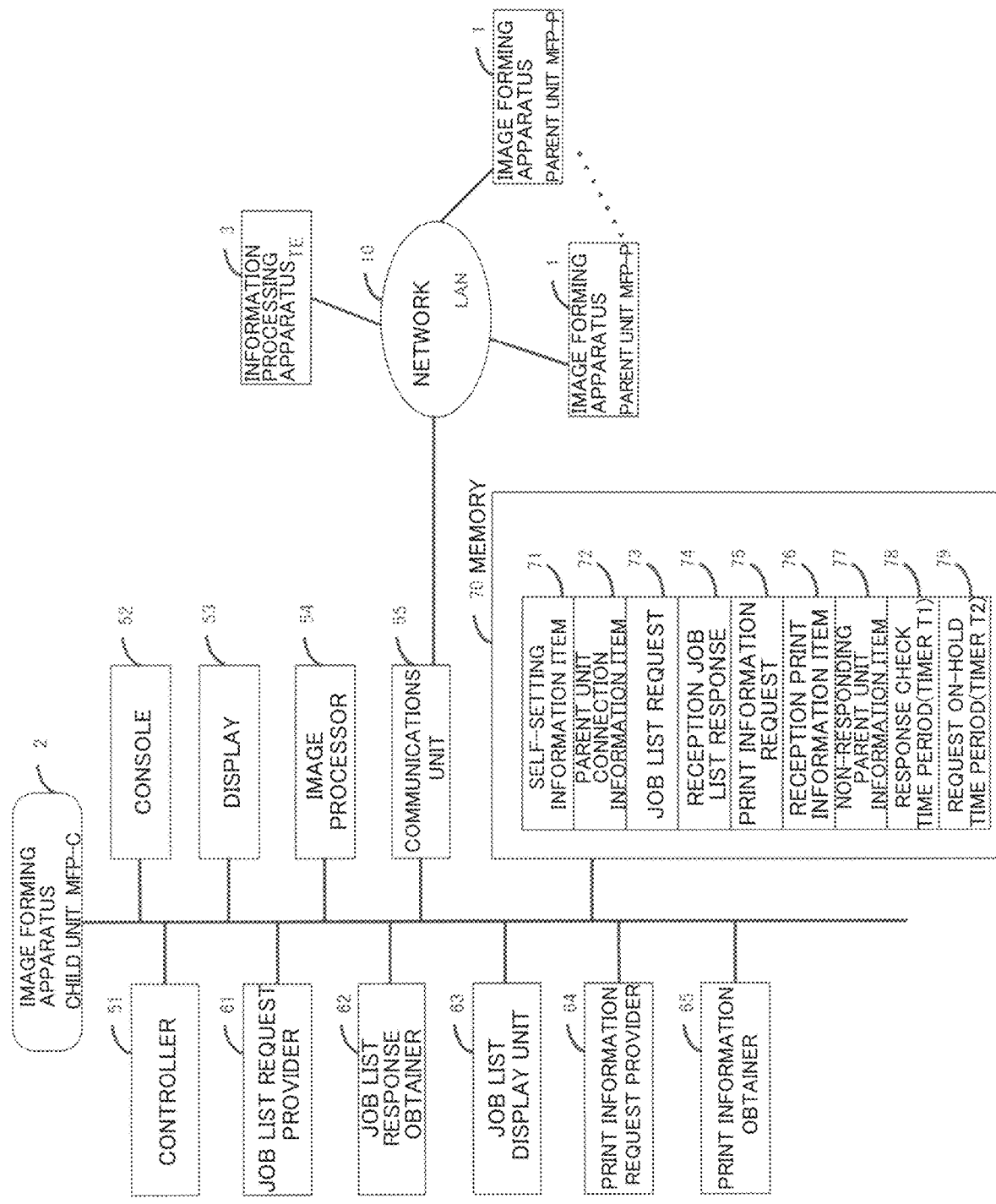
FIG. 3 is a block diagram illustrating a configuration of an example of a child unit among the image forming apparatuses according to the present invention.

FIG. 3 is a block diagram illustrating a configuration of an example of a child unit among the image forming apparatuses according to an aspect of the present invention.

Similar to a parent unit, a child unit (MFP-C) 2 among the image forming apparatuses is an electronic device capable of copying, printing, document scanning, document editing, document storing, document transmitting (faxing), and performing communications.

As illustrated in FIG. 3, the child unit 2 can connect to the parent units 1 and the information processing apparatus 3 to perform data communications through the network 10 such as a LAN.

In FIG. 3, the child unit (MFP-C) 2 mainly includes: a controller 51; a console 52; a display 53; an image processor 54; a communications unit 55, a job list request provider 61; a job list response obtainer 62; a job list display unit 63; a print information request provider 64; a print information obtainer 65; and a memory 70.

The memory 70 corresponds to a second memory storing a parent unit connection information item identifying connectable parent units described above.

Similar to the controller 11 of the parent unit, the controller 51 controls operations of such constituent features as the console and the image processor. Mainly, the controller 51 is a microcomputer including a CPU, a ROM, a RAM, an I/O controller, and a timer.

Moreover, the console 52, the display 53, the image processor 54, and the communications unit 55 are also the same in functions as those of the parent unit, and will not be elaborated upon here.

Similar to the image processor 14 of the parent unit, the image processor 54 mainly includes: an image input unit; an image formation unit; and an image output unit.

The job list request provider 61 transmits a job list request from the child unit to a parent unit.

As described above, the job list request is a data item to request transmission, to the child unit, of a job name of a print data item temporarily stored on a predetermined parent unit. In principle, the job list request is transmitted to the parent units stored in a parent unit connection information item 72 to be described later.

In transmitting the job list request to connectable parent units, the job list request provider 61 finds a parent unit storing a print data item stored by the user, and obtains a job list including the job name of the print data item stored on the parent unit.

Note that, as to be described later, when a non-responding parent unit information item 77 stores a parent unit name and a timer T2 set for a predetermined request on-hold time period is running, the job list request provider 61 does not transmit the job list request to the parent unit of the parent unit name stored in the non-responding parent unit information 77.

The parent unit whose name is stored in the non-responding parent unit information 77 does not send a reply to a job list request previously transmitted. Such a parent unit could be broken or suspended because of, for example, maintenance.

The job list request provider 61 does not transmit a job list request to the parent unit that could be suspended, in order to reduce a waiting time for a reply of the response to the job list request.

Meanwhile, if no parent unit name is stored in the non-responding parent unit information 77, the job list request provider 61 transmits the job list request to the parent units stored in the parent unit connection information item 72.

The job list response obtainer 62 obtains a job list response sent back from the parent units to which the job list request has been transmitted.

As can be seen, the parent units receiving the job list request transmits a job list response, as a reply to the job list request, to the child unit that has transmitted the job list request. The job list response includes a user name, presence of a job list, and a saved job name in the job list.

For example, if the job list response includes information indicating no job list, it means that the parent unit sending back the job list response does not have a print data item stored by the user of the user name included in the job list response.

Meanwhile, if the job list response includes information indicating the presence of the job list and a saved job name, it means that the parent unit sending back the job list response has a print data item stored by the user of the user name included in the job list response.

If the job list is present, the job list includes a saved job name. The display 53 of the child unit displays the saved job name so that the user can select a print data item that he or she desires to print out.

The job list display unit 63 causes the display 53 of the child unit to display the job list included in the job list response obtained by the job list response obtainer 62.

The job list includes a saved job name of a print data item for a designated user. The job list display unit 63 causes the display 53 to display this saved job name. For example, the display 53 displays a job list display screen in FIG. 14A to be shown later.

When the user selects a print function as an input with a child unit, the child unit transmits a job list request to the connectable parent units. A parent unit storing a print data item for the user transmits a job list response including the job list.

When the job list response is obtained, the display 53 of the child unit displays a job list display screen including a saved job name identifying the print data item for the user.

For example, the job list display screen in FIG. 14A displays a job list of print data items stored by the user "US1111" on a saving parent unit whose name is "P02".

This job list displays job names of three print data items, and the job names are DAILY REPORT (F101), PROPOSAL (F102), and REPORT (F103).

The user checks the display and understands that the three print data items for the user are stored on the parent unit. Hence, from among the three print data items, the user can select a file that he or she would like to print out.

In an aspect of the present invention, the job list response obtainer 62 obtains the job list response to be sent back from the parent unit to which the job list request has been transmitted. After that, the job list display unit 63 causes the display 53 to display the job list included in the obtained job list response.

If the child unit transmitted the job list request and then detects a parent unit not sending back the job list response within a predetermined response check time period, the child unit may store, in the non-response parent unit information item, the parent unit not sending back the job list response, and then, may activate a timer to time the request on-hold time period limiting transmission of the job list request. After that, the job list display unit 63 may cause the display 53 to display: a job list included in the obtained job list response; and a warning of the parent unit not sending back the job list response.

The print information request provider 64 transmits a print information request from the child unit to a parent unit. For example, when a job name of a print data item to be printed out with the child unit is selected from the job list caused to be displayed by the job list display unit 63, the print information request provider 64 transmits a print information request, requesting transmission of the selected print data item to the child unit, to a parent unit transmitting a job list response including the job list.

As illustrated in FIG. 9 to be shown later, the print information request includes a destination parent unit name, a user name, and a requested job name.

The print information request provider 64 transmits this print information request, and requests the parent unit identified with the destination parent unit name to transmit, to the child unit, the print data item identified with the user name and the request job ID.

When receiving the print information request, the parent unit identified with the destination parent unit name transmits, to the child unit that has transmitted the print information request, a print response information item including the requested print data item.

The print information obtainer 65 obtains the print response information item; that is, a reply to the print information request.

As illustrated in FIG. 10 shown above, the obtained print response information item 37 includes print information items including a user name, a print job name, and a print data item per se.

In the child unit, the image processor 54 uses these print information items to print out the print data item.

That is, when the child unit transmits the print information request to a parent unit, and, after that, the parent unit sends the print response information item back to the child unit, the child unit prints out the print data item included in the print response information item obtained by the print information obtainer 65.

The memory 70 stores information and a program required to carry out the functions of the child units of an aspect of the present invention. The memory 70 is, for example, a semiconductor storage element such as a ROM, a RAM, and a flash memory, a storage device such as an HDD and an SDD, and other storage media.

The memory 70 stores, for example, a self-setting information item 71, the parent unit connection information item 72, a job list request 73, a reception job list response 74, a print information request 75, a reception print information item 76, the non-responding parent unit information item 77, a response check time period 78, and a request on-hold time period 79.

The self-setting information item 71 indicates that the image forming apparatus is a child unit. When this printing control system starts to operate, and when a new child unit is introduced into the printing control system, the self-setting information item 71 is previously set and stored by a manager of the printing control system.

FIG. 4B is a table showing an example of information (a self-setting information item) to be stored on the memory 70 of a child unit.

For example, the self-setting information item 71 in FIG. 4B includes, but not limited to, an identification information item, an apparatus type, and an IP address.

The identification information item is to identify the image forming apparatus, and to distinguish the image forming apparatus from another image forming apparatus that belongs to the printing control system. The identification information item is, for example, an apparatus name and a number unique to the apparatus. In FIG. 4B, an identification information item "C001" is set.

The apparatus type is information for setting the image forming apparatus to a child unit. As illustrated in FIG. 4B, for example, if the apparatus type "child unit" is set, the image forming apparatus functions as a child unit.

The IP address is information assigned to each of the communications appliances connected to the network 10 in order to identify the appliance. Commonly, either a global IP address or a private IP address is set for each of the image forming apparatuses.

The self-setting information 71 in FIG. 4B indicates that this child unit has an IP address "192.168.10.51".

Note that this IP address may be used as the identification information item described above.

The parent unit connection information item 72 is information as to a connectable parent unit.

The child unit can transmit and receive information to and from a parent unit set in the parent unit connection information item 72.

FIG. 5B is a table showing an example of information (a parent unit connection information item) to be stored on the memory of 70 a child unit.

The parent unit connection information item 72 in FIG. 5B includes, but not limited to, a parent unit identification information item and an IP address.

The IP address alone may be used as the parent unit connection information item 72.

The parent unit identification information item corresponds to an identification information item (an apparatus name) in the above self-setting information item 31.

FIG. 5B shows that the parent unit connection information item 72 includes three parent unit identification information items (P01, P02, and P03) and their respective IP addresses. A child unit previously storing this parent unit connection information item 72 can perform information communications with the three parent units.

As described above, the job list request 73 is data to request a parent unit to send a job name of a print data item temporarily stored on the parent unit to, for example, a child unit that has transmitted a job list request.

FIG. 7 is a table showing an example of information (a job list request) to be stored on the memory 70 of a child unit.

The job list request 73 in FIG. 7 includes, but not limited to, a request apparatus name, a destination parent unit name, a user name, and a request detail.

The request detail indicates a condition to be requested to the parent unit. If requested is a job list of a specific user, for example, the request detail to be set is "JOB LIST OF USER".

The request apparatus name is a name of a child unit transmitting a job list request, and may be the IP address of the child unit.

The destination parent name is a name of a parent unit to be requested to transmit a job list, and may be the IP address of the parent unit.

The user name designates an owner of a print data item temporarily stored on a parent unit.

If the request detail of the job list request 73 is "JOB LIST OF USER", it means that requested is a job list including a job name of a print data item stored by a user having a designated user name.

FIG. 7 shows an example of two job list requests 73.

The first job list request 73 is transmitted from the child unit C006 to the parent unit P01. The request apparatus name is C006. The destination parent unit name is P01. The user name is US1111. The request detail is "JOB LIST OF USER".

This job list request 73 requests the parent unit P01 to transmit, to the child unit C006, a job list including a job name of a print data item having the user name US1111 and temporarily stored on the parent unit P01.

Moreover, the second job list request 73 is transmitted from the child unit C006 to the parent unit P02. The job list request 73 requests the parent unit P02 to transmit, to the child unit C006, a job list including a job name of a print data item having the user name US1111 and temporarily stored on the parent unit P02.

If a condition other than a specific user is to be set to request a job list, another condition may be set for the request detail.

For example, if requested is a job list only for a file having a specific document name, the request detail to be set is "JOB LIST FOR SPECIFIC DOCUMENT NAME". Other than the row of "USER NAME", a row "DOCUMENT" may be provided, and a document name such as "REPORT" may be set.

Note that, if the job list request 73 is limited to request a job list for a specific user, the request detail may be omitted.

If a child unit requests parent units to transmit a job list having a job name of a print data item stored by a specific user, the job list request provider 61 of the child unit transmits the job list request, including an identification information item (e.g., a user name) on the user, to the parent unit stored in the parent unit connection information item 72. The details of this operation will be described later.

When the job list request obtainer 22 of the parent units obtains the job list request, if the print data items stored on the memory 30 of the parent unit include a print data item stored by a user identified with the identification information item, on the user, included in the job list request, the print job response provider 23 transmits, to the child unit that has transmitted the job list request, a job list response including a job list having a job name of the print data item stored by the user.

Meanwhile, when the job list request obtainer 22 of the parent units obtains the job list request, if the print data items stored on the memory 30 of the parent unit do not include a print data item stored by the user and identified with the identification information item, on the user, included in the job list request, the print job response provider 23 transmits, to the child unit that has transmitted the job list request, a job list response indicating there is no job list having a job name of the print data item stored by the user.

In response to the job list request 73 transmitted to a parent unit, the reception job list response 74 is a response detail sent back from the parent unit. The reception job list response 74 corresponds to the job list response 35 in FIG. 8 as described above.

The child unit checks the reception job list response 74 to find out whether the parent unit, to which the child unit has transmitted the job list request 73, has a job list of a designated user. If the parent unit has the job list, the child unit obtains a saved job name included in the job list.

The print information request 75 is information to request a parent unit for a print data item to be printed out with a child unit.

For example, when the user operates a child unit to select the job name of a file that he or she would like to print out from among the saved job names included in the job list, and to input print start, the print information request 75 is transmitted from the child unit to the parent unit.

FIG. 9 is a table showing an example of information (a print information request) to be stored on the memory 70 of a child unit.

The print information request 75 in FIG. 9 includes a child unit name, a destination parent unit name, a user name, a request job name, and a request detail.

The request detail is information indicating that the print information request 75 is data to request for transmission of a print file per se. For example, the print information request 75 is set with information "PRINT FILE".

The child unit name is identification information for a child unit transmitting the print information request 75. The destination parent unit name is identification information as to a parent unit to which the print information request 75 is transmitted.

The user name designates an owner of a print data item to be printed out.

The request job name designates a job name of a print data item to be printed out.

The user name and the request job name identify a print data item to be transmitted from the parent unit to the child unit.

FIG. 9 shows an example of two job list requests 75.

The first print information request 75 is transmitted from the child unit C006 to the parent unit P02. The child unit name is C006. The destination parent unit name is P02. The user name is US1111. The request job names are F101 and F103. The request detail is "PRINT FILE".

This print information request 75 requests the parent unit P02 to transmit, to the child unit C006, two print data items among the print data items temporarily stored on the parent unit P02. The two print data items are identified with the user name US1111 and the two request job names F101 and F103.

The second print information request 75 is transmitted from the child unit C004 to the parent unit P01. This print information request 75 requests the parent unit P01 to transmit, to the child unit C004, a print data item among the print data items temporarily stored on the parent unit P01. The print data item is identified with a user name US2222 and a request job name F201.

The reception print information item 76 is included in a print response information item transmitted from a parent unit to a child unit.

For example, as the print response information item 37 in FIG. 10 shows, information including a user name, a print job name, a date, a print setting, and information including a print data item per se corresponds to the reception print information item 76.

The child unit uses this received print information 76 to print out the print data item.

The non-responding parent unit information item 77 stores information as to a parent unit that has not sent a job list back to a child unit within a predetermined period (the response check time period 78 to be described later) in response to a job list request transmitted from the child unit.

When a job list request is transmitted from a child unit to a parent unit, a response to the job list request is supposed to be sent back usually within several seconds.

If the response to the job list request is not sent back, it is probably because the destination parent unit to which the job list request is transmitted is suffering from some kind of breakdown, or is suspended because of maintenance.

As can be seen, when the parent unit to which the job list request is transmitted is suspended and unable to carry out communications such that no job list response is sent back within a response check time period to be described later, the child unit stores the parent unit in the non-responding parent unit information item 77.

FIG. 11 is a table showing an example of information (a non-responding parent unit information item) to be stored on the memory 70 of a child unit.

The non-responding parent unit information item 77 in FIG. 11 includes a parent unit name and a timer T2 remaining time period.

Here, the parent unit name is information to identify a parent unit that has not sent back a job list response within a response check time period.

The timer T2 remaining time period is a stored remaining time period, on a timer T2, corresponding to the request on-hold time period 79 to be described later.

In FIG. 11, the parent unit whose parent unit name is P02 has not sent back the job list response, and the timer T2 on the parent unit has a remaining time period of 10 minutes.

If two or more of the parent units have not sent back the job list response, a parent name and a timer T2 remaining time period are stored in association with each other for each of the two or more parent units.

After the response check time period 78 has elapsed, the child unit activates the timer T2 to time the request on-hold time period 79. Hence, a preset request on-hold time period (e.g. 10 minutes) is timed.

In order to check the elapse of the request on-hold time period 79, the remaining time period on the timer T2 is stored.

The time point at the end of the response check time period 78 for checking the reception of a job list response from a parent unit; that is, the time point when the timer T2 is activated, varies depending on a parent unit. Hence, the timer T2 remaining time period is stored in association with the parent unit name of a parent unit sending no response.

Note that if two or more parent units do not reply to the job list response, and the timers T2 are activated at the same time point among the parent units, the timer T2 remaining time period may be stored not in association with the parent unit names of the parent units sending no response.

The response check time period 78 is for checking a job response sent back from a parent unit after a child unit transmits a job list request to the parent unit.

When the child unit transmits the job list to the parent unit, the timer T1 is activated to time the response check time period 78.

Until the timer T1 times out, the reception of the job list response is checked.

FIG. 12 is a table showing an example of information (a response check time period) to be stored on the memory 70 of a child unit.

In FIG. 12, the response check time period 78 is set to 15 seconds and stored.

Note that the response check time period 78 shall not be limited to 15 seconds.

The response check time period 78 may be previously fixed to be set; however, the response check time period 78 may be changed depending on, for example, an operating status of the system and the number of connectable parent units.

An aspect of the present invention has the following features: when, in particular, a child unit transmitting a job list request detects, within a predetermined response check time period, a parent unit that has not sent back a job list response, the child unit stores, in the non-responding parent unit information item 77, the parent unit that has not sent back the job list response. When transmitting the job list request at a next time, the child unit transmits the job list request to a parent unit, among the parent units stored in the parent unit connection information item 72, other than a parent unit stored in the non-responding parent unit information item 77.

The parent unit stored in the non-responding parent unit information item 77 does not send the job list response even though the response check time period 78 has elapsed. Even if the child unit transmits the next job list request to this parent unit, the parent unit might not send the job list response back to the child unit. Hence, the user operating the child unit might have to wait until the response check time period elapses.

Thus, the child unit transmits the next job list request not to the parent unit stored in the non-responding parent unit information item 77, but to a parent unit other than the parent unit stored in the non-responding parent unit information item 77; that is, a parent unit that has sent back the job list response.

The request on-hold time period 79, a time period to limit transmission of a job list request, is previously set and stored not to transmit the job list request to a parent unit that has not sent back a job list response within a response check time period; that is, a parent unit stored in the non-responding parent unit information item 77.

The parent unit stored in the non-responding parent unit information item 77 has not sent a response back to the previous job list request. If the parent unit is still not in operation, the job list response might not be sent back within the next response check time period even if the child unit transmits the job list request again to the parent unit.

For example, if a child unit transmits a job list request to a plurality of parent units, waits for a job list response from the parent units to which the job list request has been transmitted, and displays a job list and selects a print file, one of the parent units does not send back a job list response. Hence, even though the user would like to check the job list, he or she always has to wait until the response check time period 78 elapses.

If the parent unit suspended and unable to send back the job list response has a job list, the job list cannot be displayed. As a matter of course, the user has to wait until the response check time period 78 elapses.

However, even though the child unit receives a reply of the job list response from the parent unit having the job list, if the child unit does not receive a reply of a job list response from another parent unit, the job list is displayed after the response check time period 78 elapses.

That is, if the other parent unit does not send a reply of the job list response, the user always has to wait until the response check time period 78 elapses, and cannot select a print file unless the response check time period 78 elapses. This is inconvenient for the user.

Hence, after the response check time period 78 has elapsed, the child unit starts to time the request on-hold time period 79. When transmitting the next job list request to a plurality of parent units, the child unit does not transmit the next job list request to a parent unit that has not sent back the job list response while the request on-hold time period 79 is timed, so that the user does not have to wait again until the response check time period 78 elapses.

FIG. 13 is a table showing an example of information (a request on-hold time period) to be stored on the memory 70 of a child unit. The request on-hold time period 79 is timed with a timer T2. An initial value set when the timer T2 is activated is previously set and stored as the request on-hold time period 79.

In FIG. 13, the request on-hold time period 79 is set to 10 minutes and stored.

Note that the request on-hold time period 79 shall not be limited to 10 minutes, and may be changed depending on a usage status of the system.

When the timer T1 to time the response check time period 78 times out, the child unit stores a parent unit not sending back a job list response in the non-responding parent unit information item. After that, the child unit activates the timer T2 to time the request on-hold time period 79 limiting transmission of the job list request.

Until the request on-hold time period 79 elapses; that is, while the timer T2 is running, the child unit transmits the job list request to a parent unit, among the parent units stored in the parent unit connection information item 72, other than the parent unit stored in the non-responding parent unit information item 77. The child unit does not transmit the job list request to the parent unit stored in the non-responding parent unit information item 77.

Note that the parent unit stored in the non-responding parent unit information item 77 would be out of suspension. When the timer T2 times out, the child unit preferably transmits a job list request to a parent unit that the child unit did not transmit the job list request before.

That is, after the request on-hold time period 79 has elapsed, the child unit transmits the job list request to the parent units stored in the parent unit connection information 72.

Outline of a Method for Controlling Printing on the Printing Control System According to an Aspect of the Present Invention Described below is an outline of an example of a method for controlling printing carried out between a parent unit and a child unit included in the printing control system according to an aspect of the present invention.

Parent Unit: Saving a Print Data Item

One or more print data items (print information items 33) are saved on at least any given first parent unit among a plurality of parent units.

Child Unit: Requesting a Job List

Among a plurality of child units, any given first child unit transmits the job list request 73 to a parent unit. Here, the job list request 73 requests the parent unit to transmit, to the first child unit, a job list including the job name of a print data item. The parent unit is set in the parent unit connection information 72 previously stored on the first child unit.

Child Unit: Activating the Timer T1

The first child unit transmits the job list request 73, and after that, activates the timer T1 to time the predetermined response check time period 78.

Parent Unit: Obtaining a Job List Request

The parent unit set in the parent unit connection information 72 obtains a job list request (the job list to be received 34).

Parent Unit: Responding with a Print Job

In response to the obtained job list request, the first parent unit saving the print data item transmits the job list response 35 to the first child unit. Here, the job list response 35 includes the job list including the job name of the print data item temporarily saved.

Child Unit: Obtaining a Job List Response

The first child unit obtains a job list response (the reception job list response 74) sent back from the parent unit to which the job list request has been transmitted.

Child Unit: Storing a Non-Responding Parent Unit Information Item

If the first child unit detects a parent unit that has not sent back a job list response until the response check time period 78 elapses, the first child unit stores the parent unit in the non-responding parent unit information item 77.

Child Unit: Requesting a Next Job List

When the first child unit carries out "requesting a job list" that involves transmitting the job list request 73 next time, the first child unit transmits the job list request 73 to a parent unit, included in the parent units set in the parent unit connection information, other than the parent unit stored in the non-responding parent unit information item 77.

Moreover, as described below, the child unit may activate the timer T2 to time the request on-hold time period 79 limiting transmission of the job list request, in order to distinguish between a parent unit to which the job list request is transmitted by the request on-hold time period 79 elapses and a parent unit to which the job list request is transmitted after the request on-hold time period 79 has elapsed.

Child Unit: Activating the Timer T2

After the "storing a non-responding parent unit information item", the first child unit activates the timer T2 to time the request on-hold time period 79 limiting transmission of the job list request.

Child Unit: Requesting a Job List Until the Request On-Hold Time Period Elapses

Until the request on-hold time period 79 elapses when the first child unit carries out the "requesting a job list" that involves transmitting the job list request next time, the first child unit transmits the job list request 73 to a parent unit, included in the parent units stored in the parent unit connection information 72, other than the parent unit stored in the non-responding parent unit information item 77.

Child Unit: Requesting a Job List after the Request On-Hold Time Period has Elapsed After the request on-hold time period 79 has elapsed while the first child unit carries out "requesting a job list" that involves transmitting the job list request 73 next time, the first child unit transmits the job list request 73 to the parent units stored in the parent unit connection information 72.

Figure 15:
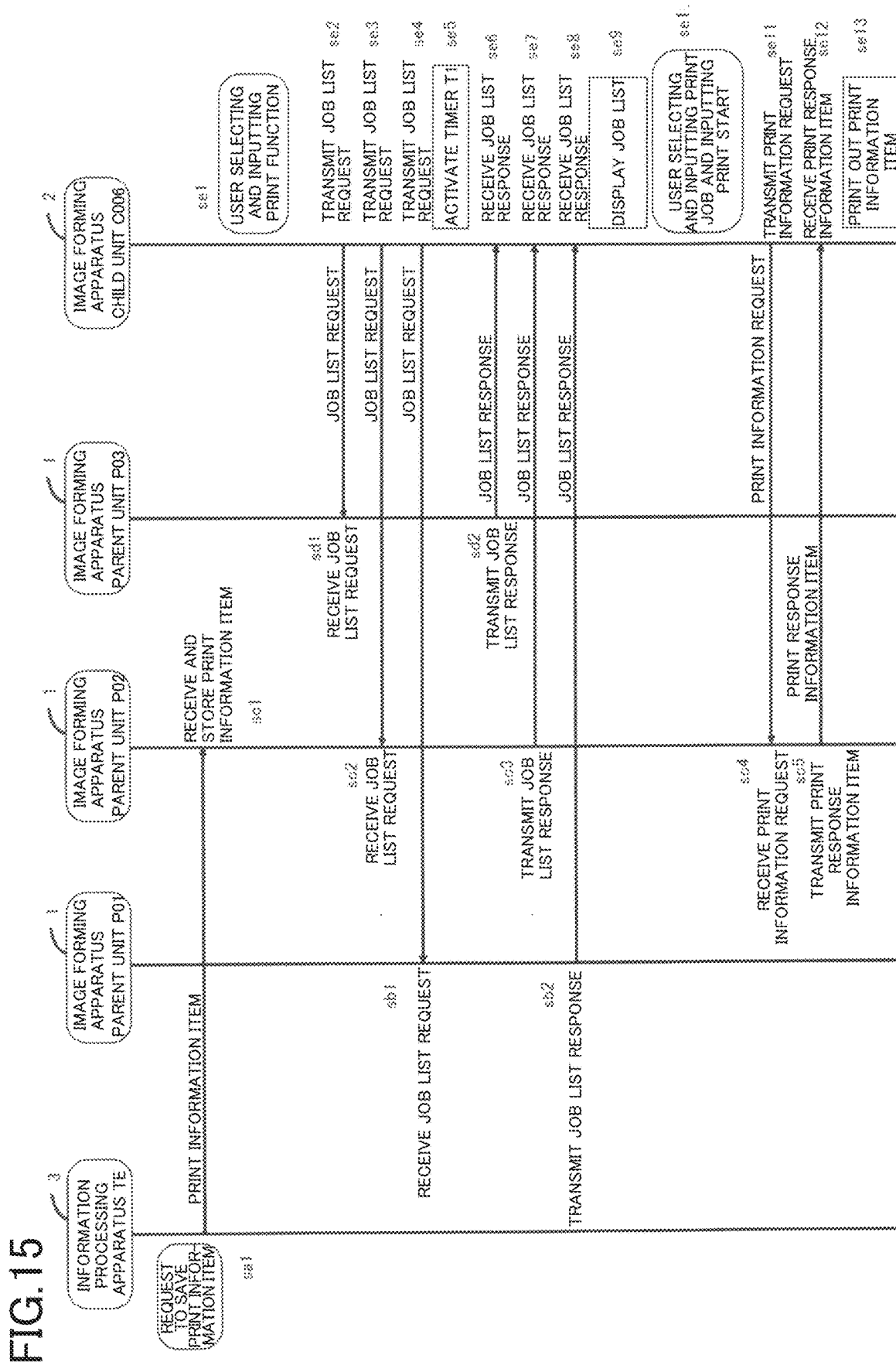
FIG. 15 is a diagram illustrating an example of an information communications sequence carried out by the printing control system according to the present invention.

Print Control Processing on the Printing Control System According to an Aspect of the Present Invention First Example of Processing for Controlling Printing FIG. 15 is a diagram illustrating an example of an information communications sequence in print control processing carried out by the printing control system according to an aspect of the present invention.

Described here is an information communications sequence performed among one information processing apparatus TE, three parent units (P01, P02, and P03), and one child unit C006.

In the information communications sequence, the three parent units are not suspended, and capable of transmitting a job list response.

The child unit C006 stores, as the parent unit connection information item 72, identification information items as to the three parent units (P01, P02, and P03) illustrated in FIG. 5B.

At Step sa1 in FIG. 15, the information processing apparatus TE sends a request to save a print information item.

In the request to save the print information item, for example, the user US1111 operates the information processing apparatus TE and inputs a request to save on the parent unit P02 a print data item (a print data item having the job name F101) created by the user US1111.

In such a case, the print information item to be created is the first information item in FIG. 6. The created information, including the print data item per se having the job name F101, is transmitted to the parent unit P02.

At Step sc1, the parent unit P02 receives the print information item transmitted from the information processing apparatus TE, and stores the print information item on the memory 30.

Next, at Step se1 in FIG. 15, the user selects and inputs a print function.

Here, the user US1111 moves to the child unit C006. Using a console of the child unit C006, the user US1111 causes the child unit C006 to display a function selection screen allowing the user US1111 to select a function of his or her choice. The user US1111 then selects the print function as an input.

At Steps se2, se3, and se4, the child unit C006 transmits a job list request to the parent units to obtain an information item to be printed out.

For example, the job list request to be transmitted is the first job list request in FIG. 7. The child unit C006 stores, as the parent unit connection information item 72, the identification information items as to the three parent units (P01, P02, and P03). Hence, the child unit C006 transmits a job list request to the three parent units (P01, P02, and P03).

At Step se5, the child unit C006 activates the timer T1.

At Steps sb1, sc2, and sd1, each of the three parent units (P01, P02, and P03) receives the job list request.

Upon receiving the job list request, each parent unit checks whether the print data item stored by the user US1111 is stored on its own memory 30, and creates a job list response.

The parent unit P02 has the print data item (the print data item having the job name F101) stored by the user US1111, and creates a job list response including a saved job name F101 and "JOB LIST AVAILABLE".

Meanwhile, the parent units P01 and P03 do not have the print data item stored by the user US1111, and create a job list response including "JOB LIST UNAVAILABLE".

At Steps sb2, sc3, and sd2, each of the three parent units (P01, P02, and P03) transmits the created job list response to the child unit C006 that has transmitted the job list request.

At Steps se6, se7, and se8, the child unit C006 receives the job list responses.

The child unit C006 checks the details of the job list responses received from the parent units, and obtains a job list from the job list response including "JOB LIST AVAILABLE". Then, the child unit C006 obtains the saved job name included in the job list.

For example, if the child unit C006 receives the first job list response in FIG. 8, the child unit C006 obtains the three saved job names (F101, F102, and F103), and detects that the parent unit P02 stores the three print data items having the saved job names F101, F102, and F103.

At Step se9, the display 53 of the child unit C006 displays the obtained job list.

For example, the display 53 of the child unit C006 displays the job list display screen in FIG. 14A.

At Step se10, the user US1111 watches the job list display screen displayed on the display 53 of the child unit C006 to check the print data item that he or she has stored on the parent unit, and selects and inputs the print job name of a print data item that he or she would like to print out.

For example, on the job display screen in FIG. 14A, the user US1111 checks a selection box for the print job name of a print data item of his or her choice.

FIG. 14A shows that the user US1111 checks selection boxes corresponding to two print job names (F101 and F103).

After that, the user US1111 selects and input "PRINTING START" on the job display screen in FIG. 14A.

At Step se11, the child unit C006 transmits the print information request 75 to the parent unit P02 that has transmitted the job list response including the "JOB LIST AVAILABLE" and the saved job name. As the first print information request in FIG. 9 shows, the print information request 75 includes the print job names (F101 and F103) selected and input as request job IDs.

At Step sc4, the parent unit P02 receives the print information request. The parent unit P02 reads, from the memory 30, print data items having print job names included in the print information request, and creates the print response information item 37.

For example, as shown in FIG. 10, the print response information item 37 includes the print job names (F101 and F103) as print request job IDs and the print data items per se having these print job names.

At Step sc5, the parent unit P02 transmits the created print response information item 37 to the child unit C006.

Moreover, after transmitting the print response information item 37, the parent unit P02 may delete, from the memory 30, the print data items having the print job names included in the print information request.

Alternatively, after the child unit C006 prints out the print data items, and the parent unit P02 receives a print end notice from the child unit C006, the parent unit P02 may delete the print data items from the memory 30.

At Step se12, the child unit C006 receives the transmitted print response information item 37.

At Step se13, the child unit C006 obtains the print data items having the print job names (F101 and F103) included in the received print response information item 37. A print output unit of the child unit C006 prints out the print data items on predetermined printing paper.

Hence, the information communications sequence in the print control processing ends, and the print data items stored by the user on the parent unit are printed out from a child unit different from the parent unit.

Note that, in the information communications sequence, the child unit C006 prints out the print data items. Alternatively, the image forming apparatus that actually prints out the print data items may be a parent unit other than the child unit and different from the parent unit storing the print data items.

In the information communications sequence in FIG. 15, the child unit C006 receives the job list response from the connectable parent units. Hence, the child unit C006 does not have to wait for the time out of the timer T1. Upon receiving the job list response from the third parent unit, the child unit C006 displays the obtained job list.

Second Example of Print Control Processing

Figure 16:
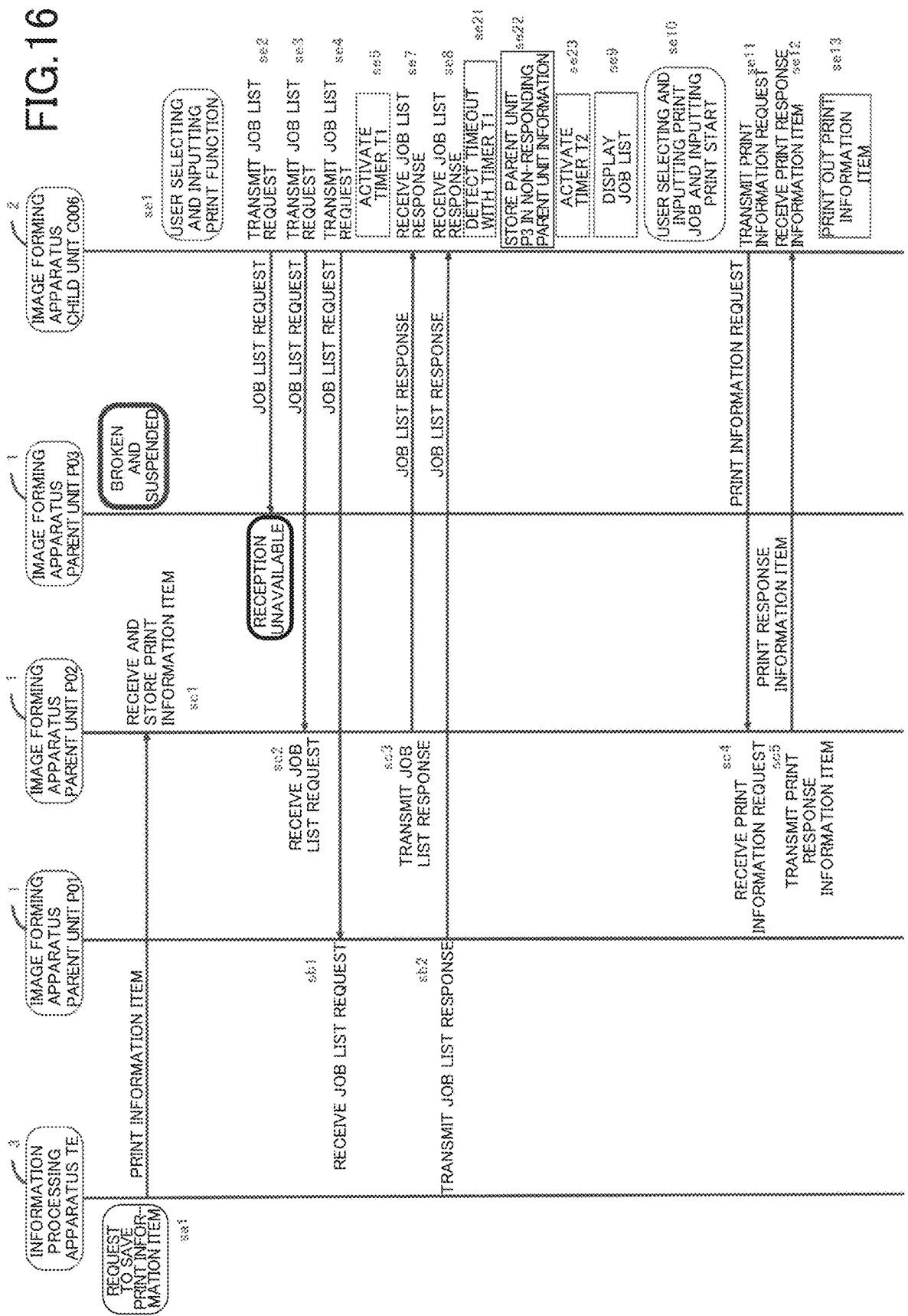
FIG. 16 is a diagram illustrating an example of an information communications sequence carried out by the printing control system according to the present invention when a parent unit is suspended.

FIG. 16 is a diagram illustrating an example of an information communications sequence carried out by the printing control system according to an aspect of the present invention when a parent unit is suspended.

As can be seen in FIG. 15, described here is an information communications sequence performed among one information processing apparatus TE, three parent units (P01, P02, and P03), and one child unit C006.

In FIGS. 15 and 16, like reference signs designate identical steps in the processing.

Unlike FIG. 15, in the information communications sequence in FIG. 16, only the parent unit P3 of the three parent units is suspended, and the other parent units (P01 and P02) are capable of transmitting a job list response.

The child unit C006 stores, as the parent unit connection information item 72, the identification information items as to three parent units (P01, P02, and P03) in FIG. 5B.

The parent unit P03 is suspended, and not capable of receiving such information as a job list request from the child unit C006.

At Step sa1 in FIG. 16, as can be seen in FIG. 15, the information processing apparatus TE sends a request for saving a print information item.

In the request for saving the print information item, for example, the user US1111 operates the information processing apparatus TE and inputs a request for saving on the parent unit P02 a print data item (a print data item having the job name F101) created by the user US1111.

In such a case, the print information item to be created is the first information item in FIG. 6. The created information, including the print data item having the job name F101, is transmitted to the parent unit P02. At Step sc1, the parent unit P02 receives the print information item transmitted from the information processing apparatus TE, and stores the print information item on the memory 30.

Next, at Step se1 in FIG. 16, the user selects and inputs a print function.

Here, as can be seen in FIG. 15, the user US1111 moves to the child unit C006. Using a console of the child unit C006, the user US1111 causes the child unit C006 to display a function selection screen allowing the user US1111 to select a function of his or her choice. The user US1111 then selects the print function as an input.

At Steps se2, se3, and se4, the child unit C006 transmits a job list request to the parent units to obtain an information item to be printed out.

For example, the job list request to be transmitted is the first job list request in FIG. 7.

The child unit C006 stores, as the parent unit connection information item 72, the identification information items as to the three parent units (P01, P02, and P03). Hence, the child unit C006 transmits a job list request to the three parent units (P01, P02, and P03).

At Step se5, the child unit C006 activates the timer T1.

At Steps sb1 and sc2, each of the two parent units (P01 and P02) receives the job list request.

Upon receiving the job list request, each parent unit checks whether the print data item stored by the user US1111 is stored on its own memory 30, and creates a job list response.

The parent unit P02 has the print data item (the print data item having the job name F101) stored by the user US1111, and creates a job list response including a saved job name F101 and "JOB LIST AVAILABLE".

Meanwhile, the parent unit P01 does not have the print data item stored by the user US1111, and creates a job list response including "JOB LIST UNAVAILABLE".

The job list request is also transmitted to the parent unit P03. However, the parent unit P03 is suspended, and does not receive the job list request or create a job list response.

At Steps sb2 and sc3, each of the two parent units (P01 and P02) transmits the created job list response to the child unit C006 that has transmitted the job list request. The parent unit P03 is suspended, and does not transmit to the job list response.

At Steps se7 and se8, the child unit C006 receives the job list response from each of the two parent units (P01 and P02).

The job list response from the parent unit P03 is not received. At Step se21, the time out of the timer T1 is detected.

When the time out of the timer T1 is detected, the child unit C006 determines that the job list response has not been received from the parent unit P03 of the three parent units (P01, P02, and P03).

Hence, at Step se22, the child unit C006 stores the parent unit P03 in the non-responding parent unit information item 77. At Step se23, the child unit C006 activates the timer T2.

At Step se21, the time out of the timer T1 is detected. After that, the child unit C006 checks the details of the job list responses received from the two parent units, and obtains a job list from the job list response including "JOB LIST AVAILABLE". Then, the child unit C006 obtains the saved job name included in the job list.

For example, if the child unit C006 receives the first job list response in FIG. 8, the child unit C006 obtains the three saved job names (F101, F102, and F103), and detects that the parent unit P02 stores the three print data items having the saved job names F101, F102, and F103.

At Step se9, the display 53 of the child unit C006 displays the obtained job list.

For example, as can be seen in the sequence in FIG. 15, the display 53 of the child unit C006 displays the job list display screen in FIG. 14A.

After that, processing from Steps se10 to se13, sc4, and sc5 in FIG. 15 is executed.

At Step se10, the user US1111 looks at the job list display screen displayed on the display 53 of the child unit C006. The user US1111 then selects and inputs the print job names of print data items of his or her choice, and then selects and inputs "PRINTING START". At Step se11, the child unit C006 transmits the print information request 75 to the parent unit P02.

As the first print information request in FIG. 9 shows, the print information request 75 includes the print job names (F101 and F103) selected and input as request job names.

At Step sc4, the parent unit P02 receives the print information request. The parent unit P02 reads, from the memory 30, print data items having print job names included in the print information request, and creates the print response information item 37. At Step sc5, the parent unit P02 transmits the created print response information item 37 to the child unit C006.

As shown in FIG. 10, the print response information item 37 includes the print job names (F101 and F103) as print request job IDs and the print data items per se having these print job names.

At Step se12, the child unit C006 receives the transmitted print response information item 37. At Step se13, the child unit C006 obtains the print data items having the print job names (F101 and F103) included in the received print response information item 37. A print output unit of the child unit C006 prints out the print data items on predetermined printing paper.

Hence, the information communications sequence in processing for the print control processing, and the print data items stored by the user on the parent unit are printed out from a child unit different from the parent unit.

Note that, in the information communications sequence, the child unit C006 prints out the print data items. Alternatively, the image forming apparatus that actually prints out the print data items may be a parent unit other than the child unit and different from the parent unit storing the print data items.

In the information communications sequence in FIG. 16, the job list response cannot be received from the one suspended parent unit P03 among the connectable parent units. Thus, the obtained job list is not displayed on the child unit C006 until the timer T1 times out.

Hence, the timing to display the job list is excessively late, and the user has to wait until he or she can input the print job name.

However, at Step se22 in FIG. 16, the child unit C006 stores the parent unit P03 in the non-responding parent unit information item 77. At Step se23, the child unit C006 activates the timer T2. Hence, when transmitting the next job list request to the parent unit, the child unit C006 does not transmit the job list request to the parent unit P3 stored in the non-responding parent unit information item 77 while the timer T2 is running as seen in FIG. 17 to be described later.

Hence, in selecting and inputting the next print function with the child unit C006, the child unit C006 does not have to wait for the time out of the timer T1. Upon receiving the job list responses from the two parent units (P01 and P02), the child unit C006 allows the display 53 to immediately show the obtained job list.

Third Example of Print Control Processing

Figure 17:
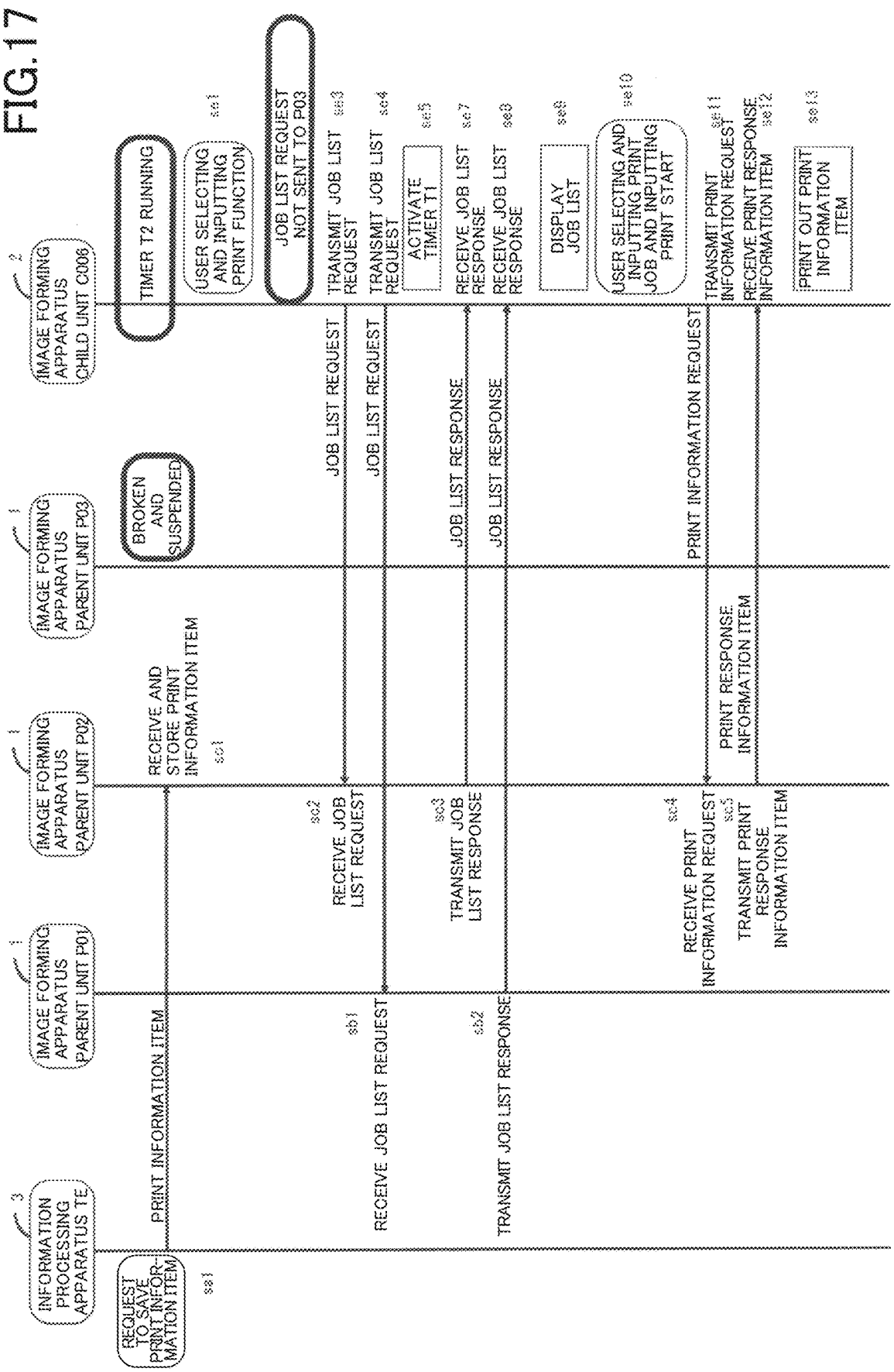
FIG. 17 is a diagram illustrating an example of an information communications sequence carried out by the printing control system according to the present invention when a parent unit is suspended and a timer set for request on-hold time period is running.

FIG. 17 is a diagram illustrating an example of an information communications sequence carried out by the printing control system according to an aspect of the present invention when a parent unit is suspended and a timer set for request on-hold time period is running.

As can be seen in FIG. 15, described here is an information communications sequence performed among one information processing apparatus TE, three parent units (P01, P02, and P03), and one child unit C006.

In FIGS. 15 and 17, like reference signs designate identical steps in the processing.

Unlike FIG. 15, in the information communications sequence in FIG. 17, only the parent unit P3 of the three parent units is suspended, and the other parent units (P01 and P02) are capable of transmitting a job list response. Unlike FIG. 16, in the information communications sequence in FIG. 17, the timer T2 is running in the child unit C006.

The child unit C006 stores, as the parent unit connection information item 72, the identification information items on three parent units (P01, P02, and P03) in FIG. 5B.

The parent unit P03 is suspended, and not capable of receiving such information as a job list request from the child unit C006.

At Step sa1 in FIG. 17, as can be seen in FIG. 15, the information processing apparatus TE sends a request for saving a print information item.

In the request for saving the print information item, for example, the user US1111 operates the information processing apparatus TE and inputs a request for saving on the parent unit P02 a print data item (a print data item having the job name F101) created by the user US1111.

In such a case, the print information item to be created is the first information item in FIG. 6. The created information, including the print data item having the job name F101, is transmitted to the parent unit P02. At Step sc1, the parent unit P02 receives the print information item transmitted from the information processing apparatus TE, and stores the print information item on the memory 30.

Next, at Step se1 in FIG. 17, the user selects and inputs a print function.

Here, as can be seen in FIG. 15, the user US1111 moves to the child unit C006. Using a console of the child unit C006, the user US1111 causes the child unit C006 to display a function selection screen allowing the user US1111 to select a function of his or her choice. The user US1111 then selects the print function as an input.

At Steps se3, and se4, the child unit C006 transmits a job list request to parent units to obtain an information item to be printed out.

For example, the job list request to be transmitted is the first job list request in FIG. 7.

Unlike FIGS. 15 and 16, the parent unit P3 in FIG. 17 is stored in the non-responding parent unit information item 77. If the timer T2 is running, the child unit C006 does not transmit the job list request to the parent unit P03, of the three parent units (P01, P02, and P03), stored in the non-responding parent unit information item 77. Alternatively, the child unit C006 transmits the job list request to the other parent units (P01 and P02).

At Step se5, the child unit C006 activates the timer T1.

At Steps sb1 and sc2, each of the two parent units (P01 and P02) receives the job list request.

Upon receiving the job list request, each parent unit checks whether the print data item stored by the user US1111 is stored on its own memory 30, and creates a job list response.

The parent unit P02 has the print data item (the print data item having the job name F101) stored by the user US1111, and creates a job list response including a saved job name F101 and "JOB LIST AVAILABLE".

Meanwhile, the parent unit P01 does not have the print data item stored by the user US1111, and creates a job list response including "JOB LIST UNAVAILABLE".

Note that the job list request is not transmitted to the parent unit P03, and the parent unit P03 does not create the job list response.

At Steps sb2 and sc3, each of the two parent units (P01 and P02) transmits the created job list response to the child unit C006 that has transmitted the job list request. The parent unit P03 does not transmit the job list response.

At Steps se7 and se8, the child unit C006 receives the job list response from each of the two parent units (P01 and P02).

The child unit C006 checks the details of the job list responses received from the two parent units, and obtains a job list from the job list response including "JOB LIST AVAILABLE". Then, the child unit C006 obtains the saved job name included in the job list.

For example, if the child unit C006 receives the first job list response in FIG. 8, the child unit C006 obtains the three saved job names (F101, F102, and F103), and detects that the parent unit P02 stores the three print data items having the saved job names F101, F102, and F103.

Here, the child unit C006 receives the job list responses from the parent units (P01 and P02) to which the child unit C006 has transmitted the job list requests. Hence, the processing proceeds to the next step and the job list is displayed, without waiting for the time out of the timer T1.

At Step se9, the display 53 of the child unit C006 displays the obtained job list.

For example, as can be seen in the sequence in FIG. 15, the display 53 of the child unit C006 displays the job list display screen in FIG. 14A.

After that, processing from Steps se10 to se13, sc4, and sc5 in FIG. 15 is executed.

At Step se10, the user US1111 sees the job list display screen displayed on the display 53 of the child unit C006. After that, the user US1111 selects and inputs a print job name of a print data item of his or her choice, and then selects and inputs "PRINTING START". At Step se11, the child unit C006 transmits the print information request 75 to the parent unit P02.

As the first print information request in FIG. 9 shows, the print information request 75 includes, as request job IDs, the print job names (F101 and F103) selected and input.

At Step sc4, the parent unit P02 receives the print information request. The parent unit P02 reads, from the memory 30, print data items having print job IDs included in the print information request, and creates the print response information item 37. At Step sc5, the parent unit P02 transmits the created print response information item 37 to the child unit C006.

As shown in FIG. 10, the print response information item 37 includes the print job names (F101 and F103) as print request job IDs and the print data items per se having these print job names.

At Step se12, the child unit C006 receives the transmitted print response information item 37. At Step se13, the child unit C006 obtains the print data items having the print job names (F101 and F103) included in the received print response information item 37. A print output unit of the child unit C006 prints out the print data items on predetermined printing paper.

Hence, the information communications sequence in processing for the print control processing, and the print data items stored by the user on the parent unit are printed out from a child unit different from the parent unit.

Note that, in the information communications sequence, the child unit C006 prints out the print data items. Alternatively, the image forming apparatus that actually prints out the print data items may be a parent unit other than the child unit and different from the parent unit storing the print data items.

In the information communications sequence in FIG. 17, the child unit C006 stores the parent unit P03 in the non-responding parent unit information item 77. While the timer T2 is running, the child unit C006 transmits the job list request not to the parent unit P03 stored in the non-responding parent unit information item 77, but to the parent units (P01 and P02) that transmitted job list responses last time.

Hence, in selecting and inputting the next print function with the child unit C006, the child unit C006 transmits the job list request not to the parent unit P03 that is still suspended and might not send back the job list response, but to the parent units (P01 and P02) that might send back the job list responses. Hence, the user does not have to wait for the time out of the timer T1. Upon receiving the job list responses from the two parent units (P01 and P02), the child unit C006 allows the display 53 to immediately show the obtained job list.

Fourth Example of Print Control Processing

Figure 18:
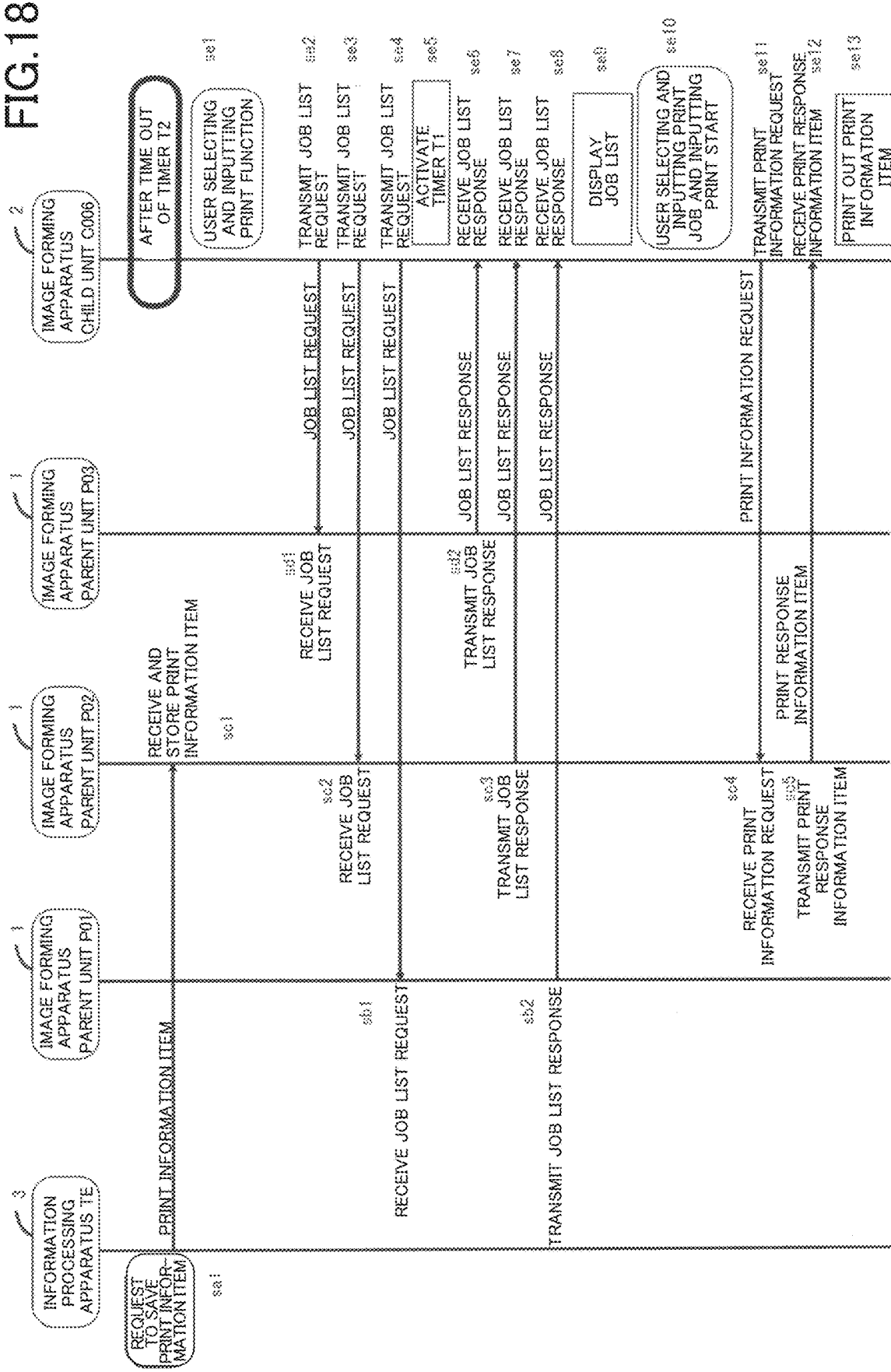
FIG. 18 is a diagram illustrating an example of an information communications sequence carried out by the printing control system according to the present invention after the timer set for the request on-hold time period has timed out.

FIG. 18 is a diagram illustrating an example of an information communications sequence carried out by the printing control system according to an aspect of the present invention after the timer T2 set for the request on-hold time period has timed out.

As can be seen in FIG. 15, described here is an information communications sequence performed among one information processing apparatus TE, three parent units (P01, P02, and P03), and one child unit C006.

In FIGS. 15 and 18, like reference signs designate identical steps in the processing.

The child unit C006 stores, as the parent unit connection information item 72, the identification information items on three parent units (P01, P02, and P03) in FIG. 5B.

Unlike FIG. 17, the timer T2, set for the request on-hold time period and running in the child unit C006, has timed out, and, after that, the information on the parent unit P03 stored in the non-responding parent unit information item 77 is deleted.

The child unit C006 cannot determine whether the parent unit P03 has recovered from suspension, or has been able to receive information items such as a job list request from the child unit C006. However, the information on the parent unit P3 stored in the non-responding parent unit information item 77 has been deleted. Hence, the child unit C006 transmits the job list request to the connectable parent units (P01, P02, and P03).

Moreover, in FIG. 18, the suspended parent unit P03 has recovered, and is able to communicate with another image forming apparatus.

Because the parent unit P03 has recovered from suspension, the parent units (P01, P02, and P03) are able to receive such information as a job list request from the child unit C006.

In FIG. 18, if normal information communications can be held among the information processing apparatus TE, the three parent units (P01, P02, and P03), and the child unit C006, and if a job list request is normally received by the three parent units (P01, P02, and P03) and job list responses are normally received by the child unit C006, the information communications sequence is carried out as seen in FIG. 15.

Hence, in the information communications sequence in FIG. 18, if the communicable parent units (P01, P02, and P03) can hold communications with the child unit C006 after the timer T2 for setting the request on-hold time period has timed out, the same processing as Steps sa1 to se13 in FIG. 15 is executed to print out a print data item. That is, the information communications sequence in FIG. 18 is the same as that in FIG. 15, and will not be elaborated upon here.

Meanwhile, if the parent unit P03 is not recovered and still suspended after the timer T2 set for the request on-hold time period has timed out, the job list request to be transmitted to the parent unit P03 is not received by the parent unit P03. Hence, the same processing as that in the information communications sequence in FIG. 16 is executed.

If the request on-hold time period for which the timer T2 is set is excessively short, the parent unit P03 is not highly likely to recover, and is still suspended. Hence, the same processing as that in the information communications sequence in FIG. 16 is executed. The timer T1 times out frequently, and the user might have to wait for the check of the job list.

Note that, the request on-hold time period is appropriately set in view of a temporary communications failure for a certain short period of time and a suspension due to maintenance to be conducted for a short period of time. Such setting makes it possible to keep the timer T1 from timing out frequently, and allows the user to wait less frequently for the check of the job list.

Figure 19:
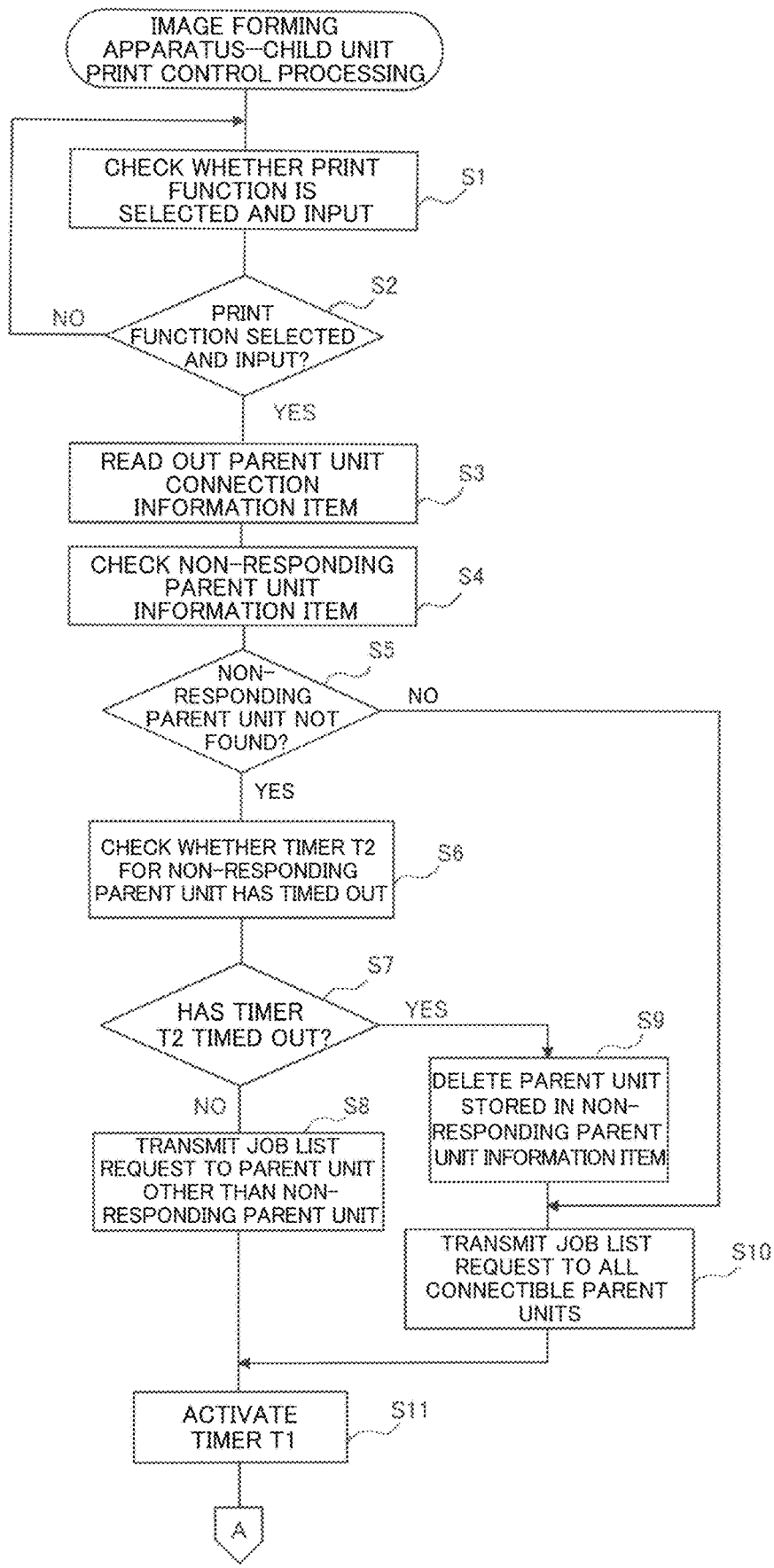
FIG. 19 is a flowchart showing an example of print control processing executed by a child unit among the image forming apparatuses according to the present invention.
Figure 20:
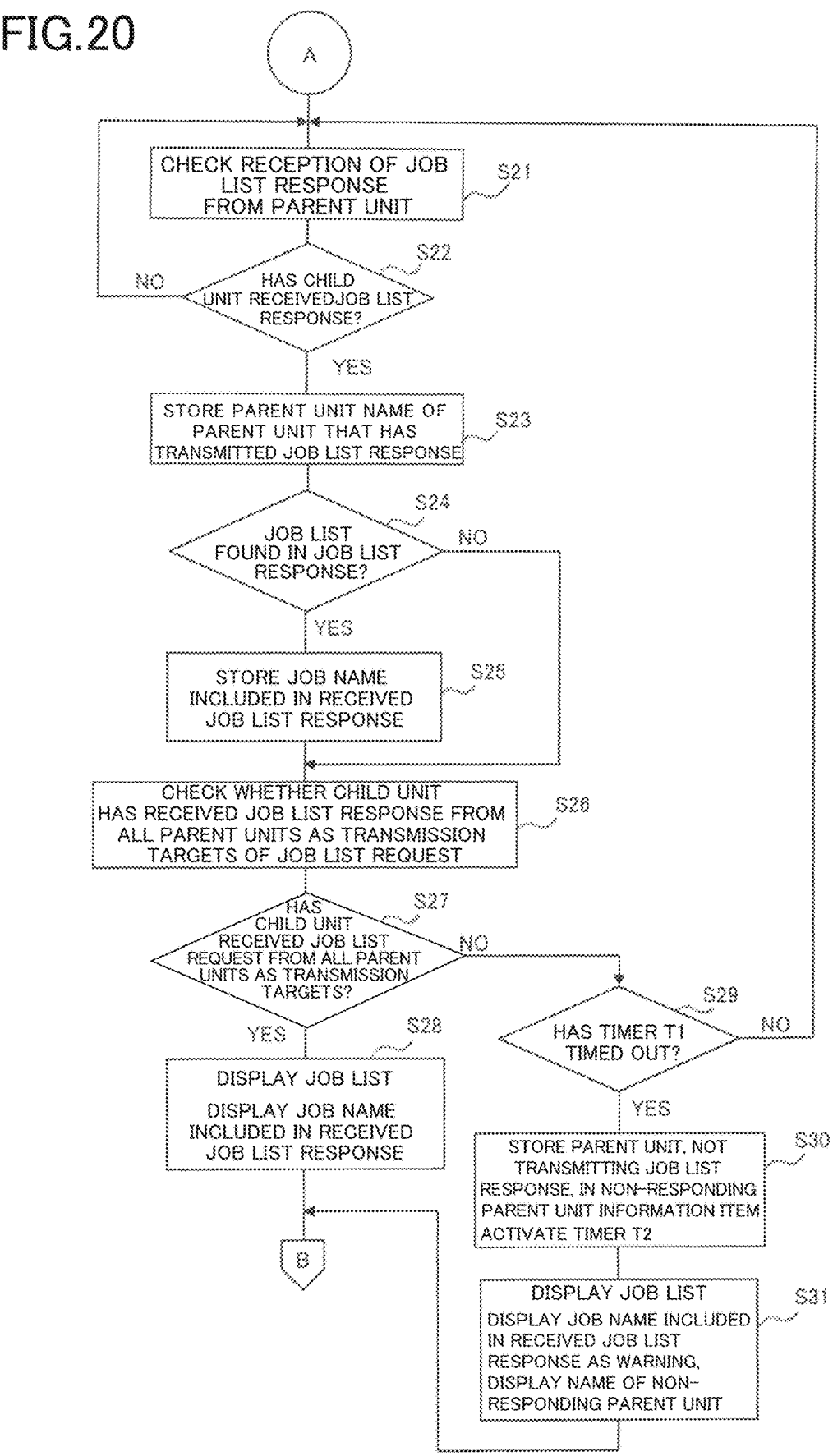
FIG. 20 is a flowchart showing an example of print control processing executed by the child unit among the image forming apparatuses according to the present invention.
Figure 21:
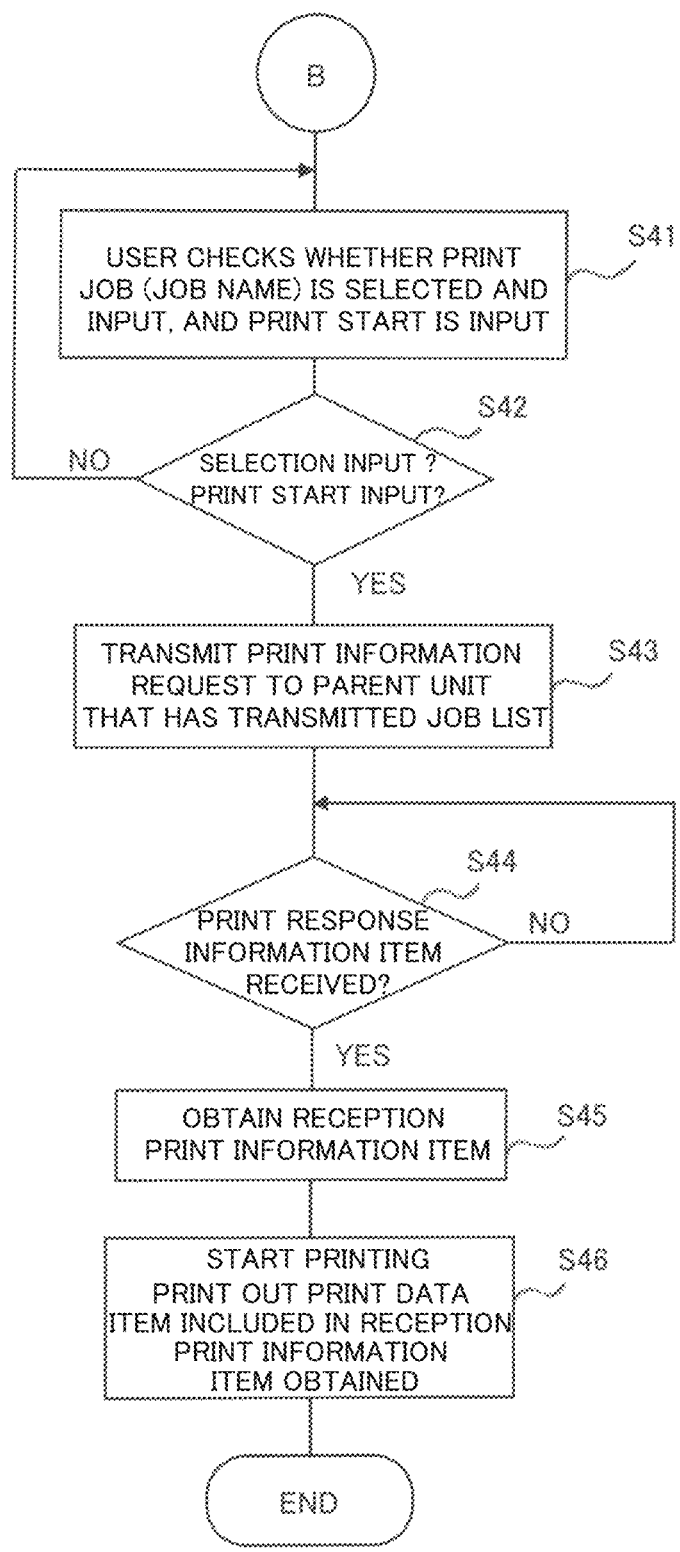
FIG. 21 is a flowchart showing an example of print control processing executed by the child unit among the image forming apparatuses according to the present invention.

Examples of Print Control Processing Executed by a Child Unit According to an Aspect of the Present Invention FIGS. 19, 20, and 21 are flowcharts showing an example of print control processing executed by the child unit among the image forming apparatuses.

FIGS. 15 to 18 show information communications sequences carried out among the apparatuses of the printing control system. Described here are flowcharts of a series of print control processing executed by a child unit in these information communications sequences.

As a precondition, as seen in the information communications sequence in such drawings as FIG. 15, the user operates the information processing apparatus TE to input an instruction to cause a predetermined parent unit to store a print data item of the user (a request operation to save a print information item). The print data item is transmitted to, and saved temporarily on, the parent unit.

At Step S1 in FIG. 19, the child unit checks whether a print function is selected and input.

Using the information processing apparatus TE, the user carries out the request operation to save a print information item. After that, the user moves to a child unit of his or her choice. In order to execute the print function to print out his or her print data item stored on the predetermined parent unit, the user operates the child unit and inputs a selection of the print function. Here, the child unit stores a user name of the user operating the child unit or an identification information item on the user.

Note that the child unit may authenticate the user before the above input operation, in order to check whether the user is authorized to use the child unit.

At Step S2, if the user selects and inputs the print function, the processing proceeds to Step S3. If not, the processing returns back to Step S1.

At Step S3, the child unit reads out the parent unit connection information item 72 stored on the memory 70 of the child unit.

At Step S4, the child unit reads out the non-responding parent unit information item 77, and checks whether the non-responding parent unit information item 77 stores a non-responding parent unit.

At Step S5, if the non-responding parent unit information item 77 does not store a non-responding parent unit, the processing proceeds to Step S10. If so, the processing proceeds to Step S6.

At Step S6, the child unit checks whether the timer T2 for the non-responding parent unit has timed out.

As illustrated in FIG. 11, if the non-responding parent unit information item 77 stores a remaining time of the timer T2 in association with the parent unit name of the non-responding parent unit, the child unit may check whether the remaining time of the timer T2 is zero.

At Step S7, if the timer T2 has timed out, the processing proceeds to Step S9. If not, the processing proceeds to Step S8.

At Step S8, the timer T2 timing the request on-hold time period is still running. Hence, the child unit transmits a job list request to a parent unit other than the non-responding parent unit stored in the non-responding parent unit information item 77.

The parent unit to which the job list request is transmitted is a parent unit, among the parent units stored in the read out parent unit connection information item 72, other than the non-responding parent unit.

The job list request is, for example, an information item in FIG. 7, and includes the user name of the user selecting and inputting the print function.

While the timer T2 is running, the child unit determines that the non-responding parent unit is likely to be still suspended, and does not transmit the job list request.

While the timer T2 is running, the child unit does not transmit the job list to the non-responding parent unit. Such a feature makes it possible reduce a time period to wait for the reception of the job list response until the time out of the timer T1 timing the response check time period.

Meanwhile, the parent unit other than the non-responding parent unit is less likely to be suspended. The child unit determines that this parent unit would send back the job list response, and transmits the job list request.

The parent unit that has received the job list request checks the user name included in the job list request, creates a job list response, and transmits the job list response to the child unit that has transmitted the job list request.

If the parent unit stores the print data item stored by the user, the parent unit transmits the job list response including the saved job name of the print data item.

If the parent unit does not store the print data item stored by the user, the parent unit transmits the job list response with "PRESENCE OF JOB LIST" set to "NONE".

At Step S9, the timer T2 timing the request on-hold time period has timed out. Hence, the child unit deletes the non-responding parent unit stored in the non-responding parent unit information item 77.

When the timer T2 times out, the suspended non-responding parent unit might have recovered and been able to receive such information as the job list request. Hence, the child unit deletes the information on the non-responding parent unit from the non-responding parent unit information item 77.

At Step S10 the child unit transmits the job list request to the parent units, which are connectable and stored in the read out parent unit connection information 72.

At Step S11, after transmitting the job list request, the child unit activates the timer T1 timing the response check time period. The processing proceeds to Step S21 in FIG. 20.

At Step S21 in FIG. 20, the child unit checks the reception of the job list response sent back from each of the parent units.

At Step S22, if the child unit has received the job list response, the processing proceeds to Step S23. If not, the processing returns back to Step S21.

The job list response is, for example, the information shown in FIG. 8.

At Step S23, the child unit checks the detail of the received job list response, and stores the parent unit name of the parent unit that has transmitted the job list response. Here, if the child unit confirms that the user name included in the job list response is the same as the user name included in the job list request, and if the job list response is a reply to the job list request, the child unit stores the name of the parent unit name.

At Step S24, the child unit checks the detail of the received job list response. If "PRESENSE OF JOB LIST" is "YES", the processing proceeds to Step S25. If not, the processing proceeds to Step S26.

At Step S25, the child unit stores "SAVED JOB NAME" included in the received job list response. The processing proceeds to Step S26.

At Step S26, the child unit confirms the parent unit name of the parent unit that has transmitted the job list response stored at Step S23, and checks whether the child unit has received the job list response from each of the parent units to which the job list request has been transmitted (all the parent units as transmission targets).

At Step S27, if the child unit has received the job list responses from all the parent units as transmission targets, the processing proceeds to Step S28. If not, the processing proceeds to Step S29.

At Step S28, the child unit displays the job list.

That is, the child unit causes the display 53 to display "SAVED JOB NAME" included in the received job list responses.

For example, the display 53 displays the job list display screen in FIG. 14A.

In order to carry out printing, the user may watch the job list display screen to select a file to be printed out from files displayed under "SAVED JOB NAME", and to input "PRINT START".

After that, the processing proceeds to Step S41 in FIG. 21.

At Step S29, the child unit checks whether the timer T1 timing the response check time period has timed out. If the timer T1 has timed out, the processing proceeds to Step S30. If not, the processing returns back to Step S21.

If the timer T1 timing the response check time period has timed out, it means that there is a parent unit not sending back the job list response even though the response check time period has elapsed.

At Step S30, the child unit stores the parent unit, not transmitting the job list response, in the non-responding parent unit information item 77.

Moreover, the child unit activates the timer T2 to time the request on-hold time period.

At Step S31, the child unit displays the job list.

Here, the child unit causes the display 53 to display "SAVED JOB NAME" included in the received job list response. However, there is a parent unit not sending back the job list response. Hence, the display 53 may display a warning indicating a suspended parent unit.

For example, the child unit causes the display 53 to display the job list display screen in FIG. 14B showing a warning "PARENT UNIT P03 SUSPENDED".

Hence, the user understands that the parent unit P03 is currently unavailable, so that the user can keep in mind not to use the parent unit P03 for a while as a parent unit to temporarily store a print data item.

After that, the processing proceeds to Step S41 in FIG. 21.

At Step S41 in FIG. 21, the user checks "SAVED JOB NAME" displayed on the job list display screen to see whether a print job (a job name) to be printed out is selected and input, and print start is input.

At Step S42, if the user inputs a selection and print start, the processing proceeds to Step S43. If not, the processing returns back to Step S41.

At Step S43, the child unit transmits a print information request to the parent unit that has transmitted the job list.

Here, the print information request includes the user name and "REQUESTED JOB NAME" indicating the job name of the print data item. The child unit transmits the print information request to the parent unit that has transmitted the job list response including "YES" in "PRESENSE OF JOB LIST" and a saved job name. For example, the child unit transmits the print information request in FIG. 9.

The parent unit receiving the print information request reads out the user name included in the print information request and the print data item identified with the requested job name. The parent unit then creates a print response information item including the read out print data item per se, and transmits the created print response information item to the child unit that has transmitted the print information request.

For example, the child unit transmits the print response information item in FIG. 10.

At Step S44, the child unit checks whether the child unit has received the print response information item. If so, the processing proceeds to Step S45. If not, the processing repeats Step S44. Alternatively, if the child unit does not have the print response information item after a predetermined time has passed, the processing may return back to Step S43 and the child unit may retransmit the print information request.

At Step S45, the child unit checks the detail of the print response information item, and obtains a reception print information item.

At Step S46, using the obtained reception print information item, the child unit prints out, on predetermined printing paper, the print data item having the print job name included in the reception print information item.

Hence, the child unit finishes the print control processing, and the print data item stored by the user on the parent unit is printed out from a child unit different from the parent unit.

Note that the user can print out the print data item also with the parent unit. If the user uses a parent unit of his or her choice for printing, the parent unit executes the same print control processing as that executed by the above child unit.

Other Embodiments of Print Control Processing According to an Aspect of the Present Invention In the printing control system of the above embodiment, if a plurality of connectable parent units include a parent unit not responding to the first job list request, the child unit determines the non-responding parent unit as a suspended parent unit due to, for example, breakdown. When transmitting the next job list to the connectible parent units, the child unit does not transmit the job list request to the suspended parent unit. Such features reduce a waiting time of the user for the response, making it possible to increase the convenience for the user.

Described below are embodiments different in function from the above embodiment.

Other Embodiment 1

In a case where a maintenance worker provides a parent unit as an image forming apparatus with periodic maintenance services or temporal repairs and maintenance services, communications of the parent unit would have to be suspended.

In such a case, before the maintenance worker intentionally suspends the parent unit, for example, he or she may perform a predetermined suspension preparation operation so that the parent unit may transmit a notification to child units stored in the child unit management information item 32 to notify the child units that the parent unit will be suspended (a notification of suspension).

Moreover, if a date and a time period when the parent unit will be suspended are previously determined, the parent unit may include the date and the time period in the notification of suspension, and transmit the notification of suspension.

At the notified date and in the notified time period, the child units receiving the notification of suspension keep from transmitting a job list request to the parent unit that has transmitted the notification of suspension.

Hence, the child unit does not transmit the job list request to a parent unit determined to have been suspended at the first transmission of the job list. Hence, the user does not have to wait for a reply to the job list request, making it possible to further increase the convenience for the user.

Other Embodiment 2

In a case where a maintenance worker provides a parent unit as an image forming apparatus with periodic maintenance services or temporal repairs and maintenance services, and when the maintenance services of the parent unit end, and, after that, the parent unit recovers from the suspended state to the normal state, the parent unit may transmit a notification to child units stored in the child unit management information item 32 to notify the child units that the parent unit has recovered (a notification of recovery).

Once receiving the notification of recovery, and, after that, when transmitting a job list request to the parent unit that has transmitted the notification of recovery, the child units may resume the transmission of the job list request to the parent unit.

Hence, the recovered parent unit transmits the notification of recovery to the child units. Upon receiving the notification of recovery, the child units can transmit a job list request to the parent unit that has transmitted the notification of recovery. Such a feature allows the recovered parent unit to be used as an image forming apparatus temporarily storing a print data item, making it possible to further increase the convenience for the user.

Other Embodiment 3

Whether or not transmitting a job list request, a child unit may periodically transmit, to a connectable parent unit, a communications confirmation request for confirming that the parent unit is communicative.

The child unit may transmit the communications confirmation request at, for example, predetermined time intervals, or a preset time of the day.

A parent unit receiving the communications confirmation request sends back a communications normal response to the child unit that has transmitted the communications confirmation request. The communications normal response indicates that the parent unit can currently hold communications.

If receiving the communications normal response, the child unit may transmit a job list request as usual to the parent unit that has transmitted the communications normal response.

Meanwhile, if there is a parent unit; that is, the parent unit P03 not transmitting the communications normal response within a predetermined time period after the child unit has transmitted the communications confirmation request, the child unit activates the timer T2 for the parent unit P03. As shown in the information communications sequence of FIG. 17, the child unit does not transmit the job list request to the parent unit P03 while the timer T2 is running.

Because periodically confirming communications, the child unit can detect a suspended parent unit. At the first transmission of the job list request, the child unit does not transmit a job list request to a parent unit possibly suspended. Hence, the user does not have to wait for a reply to the job list request, making it possible to further increase the convenience for the user.

Other Embodiment 4

Figure 22:
FIG. 22 is a view showing an example of a job list display screen to be displayed on the display of a child unit among the image forming apparatuses according to the present invention.

Moreover, the user may manually transmit a job list request. For example, a job list request key is provided to the console 52 or, as illustrated in FIG. 22, to the display 53 of a child unit. When the user presses the job list request key, the child unit transmits the job list request to the parent unit. If receiving the job list from the parent unit, the child unit updates the job list. In such a case, even though there is a parent unit not sending back a job rest response, the child unit transmits the job list request to the parent unit. Hence, even if the parent unit is stored in the non-responding parent unit information item, the child unit can receive the job list response from the parent unit if the parent unit has already been capable of sending the job list response. Thanks to the feature, the user can start printing immediately.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A printing control system, comprising:
a plurality of image forming apparatuses set as parent units; and another plurality of image forming apparatuses set as child units, all of which are connected together through a network,
each of the parent units including a first memory that stores one or more print data items, and
each of the child units including: a second memory that stores a parent unit connection information item identifying connectable parent units included in the parent units; a job list request providing circuitry that transmits a job list request to the connectable parent units stored in the parent unit connection information item, the job list request requesting the connectable parent units to transmit a job list including a job name of the one or more print data items; and a job list response obtaining circuitry that obtains a job list response sent back from the connectable parent units to which the job list request has been transmitted, wherein
if a first child unit is included in the child units, and if the first child unit transmitting the job list request detects a parent unit which is included in the connectable parent units and does not send back the job list response within a predetermined time period,
the first child unit stores, in a non-response parent unit information item, the parent unit not sending back the job list response,
when the first child unit transmits the job list request at a next time, the first child unit transmits the job list request to a parent unit, among the connectable parent units stored in the parent unit connection information item, other than the parent unit stored in the non-response parent unit information item, and
the first child unit:
stores, in the non-response parent unit information item, the parent unit not sending back the job list request, and then, activates a timer to time a request on-hold time period limiting the transmission of the job list request;
until the request on-hold time period elapses, transmits the job list request to the parent unit, among the connectable parents unit stored in the parent unit connection information item, other than the parent unit stored in the non-response parent unit information item; and
after the request on-hold time period has elapsed, transmits the job list request to the connectable parent units stored in the parent unit connection information item and deletes, from the non-response parent unit information item, the parent unit not sending back the job list response.

2. The printing control system according to claim 1, wherein
each of the child units further includes a job list display unit that causes the job list, included in the job list response obtained by the job list response obtaining circuitry, to display.

3. The printing control system according to claim 2, wherein
the job list response obtaining circuitry obtains the job list response sent back from the parent unit to which the job list request has been transmitted, and then, the job list display unit causes the job list included in the obtained job list response to display.

4. The printing control system according to claim 2, wherein
after the first child unit stores, in the non-response parent unit information item, the parent unit not sending back the job list request, and activates the timer to time the request on-hold time period limiting the transmission of the job list request, the job list display unit causes a warning of the parent unit not sending back the job list response to display.

5. The printing control system according to claim 2, wherein
the first child unit further includes:
a print information request providing circuitry that transmits a print information request to a parent unit of the connectable parent units and transmits the job list response, wherein the job list includes the job list when a job name of a print data item to be printed by the first child unit is selected from the job list to be displayed by the job list display unit, the print information request including the job name of the selected print data item and a request for transmission of the selected print data item to the first child unit; and
a print information obtaining circuitry that obtains a print response information item that is a reply to the print information request, and
when the first child unit transmits the print information request to the parent unit, and the parent unit sends back, to the first child unit, the print response information item including the selected print data item, the first child unit prints out the print data item included in the print response information item obtained by the print information obtaining circuitry.

6. The printing control system according to claim 1, wherein
if the first child requests the connectable parent units to transmit the job list having the job name of the one or more print data items stored by a specific user,
the job list request providing circuitry of the first child unit transmits the job list request, including an identification information item on the specific user, to the connectable parent units stored in the parent unit connection information item, and
when the connectable parent units obtain the job list request, if the one or more print data items stored on the first memory include a print data item stored by the specific user identified with an identification information item, on the specified user, included in the job list request, the connectable parent units transmit, to the first child unit that has transmitted the job list request, a job list response including a job list having a job name of the print data item stored by the specific user.

7. The printing control system according to claim 1, wherein
if the first child requests the connectable parent units to transmit the job list having the job name of the one or more print data items stored by a specific user,
the job list request providing circuitry of the first child unit transmits the job list request, including an identification information item on the specific user, to the connectable parent units stored in the parent unit connection information item, and
when the connectable parent units obtain the job list request, if the one or more print data items stored on the first memory do not include a print data item stored by the specific user identified with an identification information item, on the specified user, included in the job list request, the connectable parent units transmit, to the first child unit that has transmitted the job list request, a job list response indicating there is no job list having a job name of the print data items stored by the specific user.

8. The printing control system according to claim 1, wherein
the first child unit further includes a console through which the job list request is transmitted to the connectable parent units stored in the parent unit connection information item, when a user operates the console to request the transmission of the job list request.

9. An image forming apparatus set as a parent unit included in the printing control system according to claim 1.

10. An image forming apparatus set as a child unit included in the printing control system according to claim 1.

11. A method for controlling printing on a printing control system including a plurality of image forming apparatuses set as parent units and another plurality of image forming apparatuses set as child units, all of which are connected together through a network, the method comprising:
saving one or more print data items on at least one parent unit of the parent units;
transmitting a job list request from at least one child unit of the child units, to connectable parent units of the parent units;
setting, in a parent unit connection information item stored on the at least one child unit, the job list request requesting the connectable parent units to transmit a job list to the at least one child unit, the job list including a job name of the one or more print data items;
activating a first timer by the at least one child unit to time a predetermined response check time period after the at least one child unit has transmitted the job list request;
obtaining the job list request by the parent units set in the parent unit connection information item;
transmitting to the at least one child unit, by the at least one parent unit saving the one or more print data items, a job list response including the job list including the job name of the saved one or more print data items, the job list response is a reply to the obtained job list request;
obtaining, by the at least one child unit, the job list response sent back from the at least one parent unit to which the job list request has been transmitted;
storing, in a non-response parent unit information items by the at least one child unit, a parent unit which is included in the connectable parent units and does not send back the job list response, if the at least one child unit detects the parent unit by the response check time period elapses, wherein
when the at least one child unit transmits the job list request at a next time, the at least one child unit transmits the job list request to a parent unit, among the connectable parent units stored in the parent unit connection information item, other than the parent unit stored in the non-response parent unit information item, and
deleting the parent unit not sending back the job list response from the non-response parent unit information item after the response check time period has elapsed.

12. A method for controlling printing on a printing control system including a plurality of image forming apparatuses set as parent units and another plurality of image forming apparatuses set as child units, all of which are connected together through a network, the method comprising:
storing one or more print data items on the parent units;
storing, on the child units, a parent unit connection information item identifying connectable parent units included in the parent units;
transmitting, by the child units, a job list request to the connectable parent units stored in the parent unit connection information item, the job list request requesting the connectable parent units to transmit a job list, including a job name of the one or more print data items, to the child units;
obtaining, by the child units, a job list response sent back from the connectable parent units to which the job list request has been transmitted;
if the child units transmitting the job list request detect a parent unit which is included in the connectable parent units and does not send back the job list response within a predetermined time period, storing, by the child units, the parent unit in a non-response parent unit information item;
when the child units transmit the job list request at a next time, transmitting the job list request to a parent unit, among the connectable parent units stored in the parent unit connection information item, other than the parent unit stored in the non-response parent unit information item; and
deleting the parent unit not sending back the job list response from the non-response parent unit information item after the response check time period has elapsed.

* * * * *